(12) United States Patent
Tenmyo

(10) Patent No.: US 7,258,457 B2
(45) Date of Patent: Aug. 21, 2007

(54) ILLUMINATION OPTICAL SYSTEM AND IMAGE-TAKING APPARATUS

(75) Inventor: Yoshiharu Tenmyo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 10/989,420

(22) Filed: Nov. 17, 2004

(65) Prior Publication Data
US 2005/0117318 A1    Jun. 2, 2005

(30) Foreign Application Priority Data
Nov. 28, 2003   (JP) ............................. 2003-399735

(51) Int. Cl.
G03B 15/03    (2006.01)
G03B 15/06    (2006.01)
F21V 7/22     (2006.01)
G02B 6/10     (2006.01)

(52) U.S. Cl. .................... 362/16; 362/327; 362/558

(58) Field of Classification Search ................ 362/16, 362/588, 629, 3, 327, 355, 558; 396/175–177, 396/199; 385/146
See application file for complete search history.

(56) References Cited

U.S. PATENT DOCUMENTS 5,223,383 A *   6/1993   Maier et al. ................ 430/533
6,519,401 B1 *  2/2003   Imamura et al. ............ 362/558
6,530,679 B1 *  3/2003   Nishioka .................... 362/339
6,741,307 B2 *  5/2004   Matsunaga et al. ......... 362/558
7,074,463 B2 *  7/2006   Jones et al. .................. 428/1.1
2004/0196648 A1* 10/2004  Franklin et al. ............ 362/558

FOREIGN PATENT DOCUMENTS

| JP | 08-201807 | 8/1996 |
| JP | 10-115852 | 5/1998 |
| JP | 11-188268 | 7/1999 |
| JP | 11-345512 | 12/1999 |
| JP | 2000-250102 | 9/2000 |

* cited by examiner

*Primary Examiner*—Alan Cariaso
(74) *Attorney, Agent, or Firm*—Fitzpatrick, Cella, Harper & Scinto

(57) ABSTRACT

An illumination optical system includes a light source and an optical member disposed in a direction of irradiation of light from the light source. The optical member is made of a particle-containing material with particles having a particle size smaller than 1 μm contained in a base material made of a resin material.

2 Claims, 13 Drawing Sheets

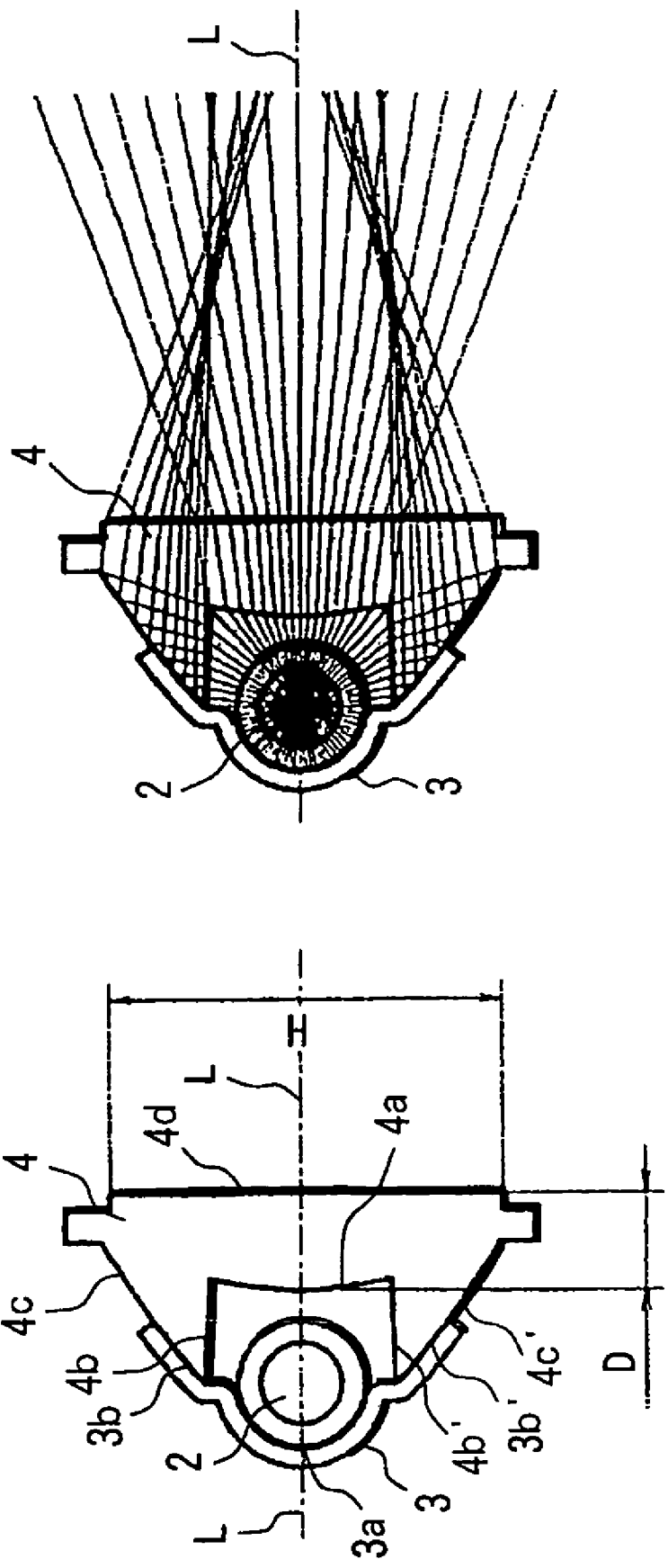

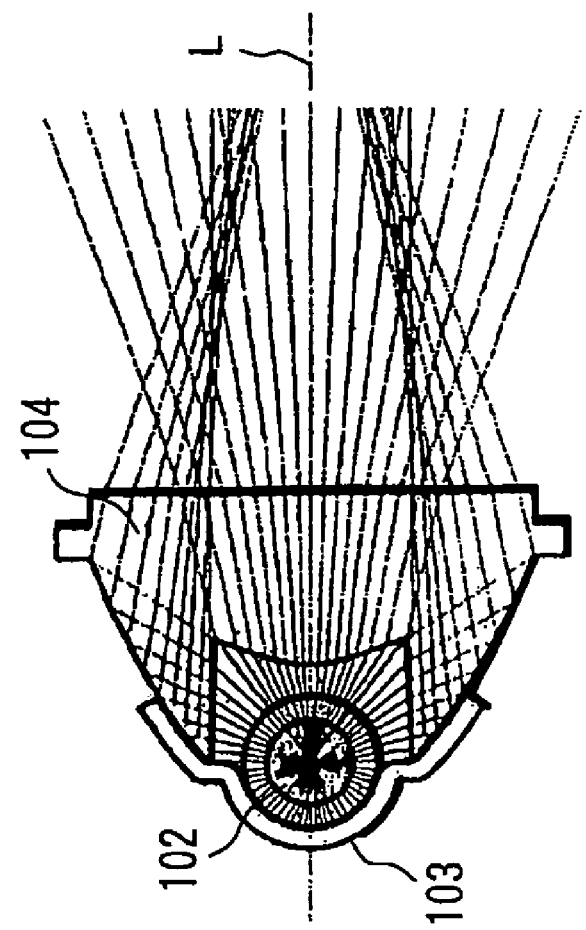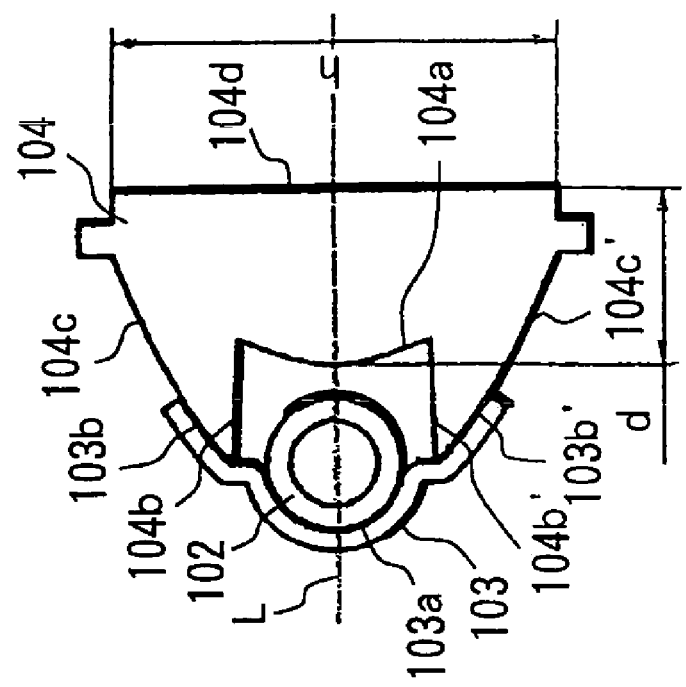
FIG.2A (PRIOR ART)
FIG.2B (PRIOR ART)

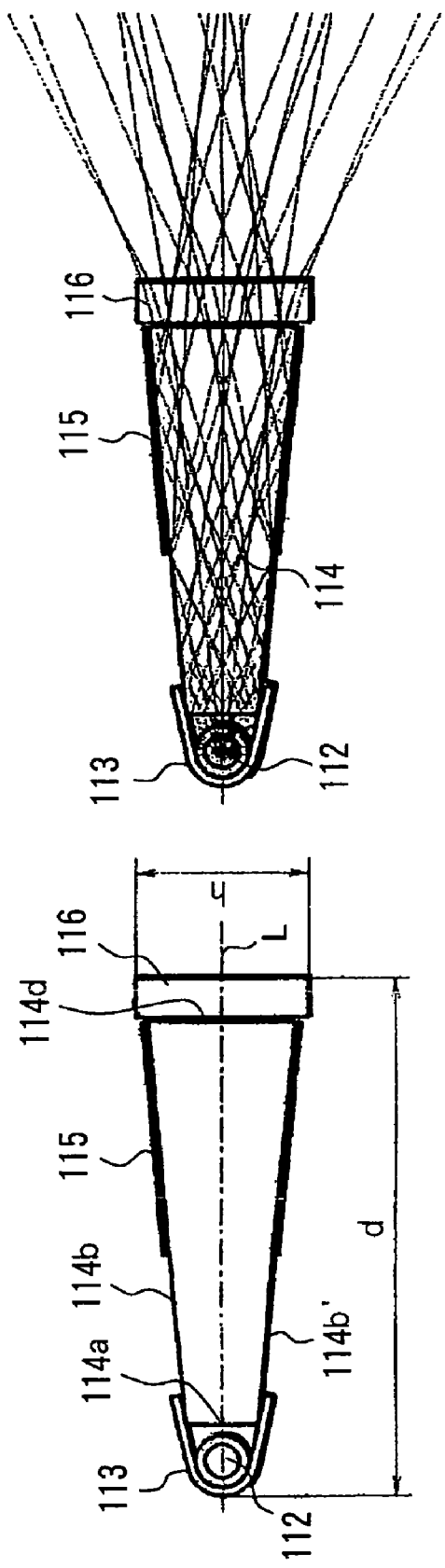

ILLUMINATION OPTICAL SYSTEM AND IMAGE-TAKING APPARATUS

BACKGROUND OF THE INVENTION

1. Field of the Invention

The present invention relates to illumination optical systems, in particular to illumination optical systems used as illumination units or the like for image-taking apparatuses.

2. Description of Related Art

Conventionally, illumination optical systems condense a luminous flux emitted from a light source within the necessary irradiation angle range with high efficiency, using an optical member such as a Fresnel lens or a reflector. The shape of the above-described optical member is optimized, and the shape of each portion of the illumination optical system is defined so as to provide predetermined light distribution characteristics.

On the other hand, as digital cameras, portable devices and the like equipped with such illumination optical systems have been increasingly downsized in recent years, miniaturization of the illumination optical systems has also been advanced. Then, there have been various proposals for suppressing the optical performance deterioration of the illumination optical systems resulting from miniaturization.

For example, a compact, highly efficient illumination optical system has been proposed which utilizes the total reflection of a prism disposed in the vicinity of the light source, as disclosed in Japanese Patent Application Laid-Open No. H10 (1998)-115852 and Japanese Patent Application Laid-Open No. 2000-250102.

On the other hand, there has been a proposal aimed at improving the characteristics of the optical material of the illumination optical system by dispersing elementary particles in the optical member. For example, Japanese Patent Application Laid-Open No. H11 (1999)-345512 has proposed a surface light source device in which layers with different refractive indices and nonuniform thickness are formed by dispersing fine particles with different refractive indices in the base material of the optical member, so that the emitted light becomes uniform.

In addition, Japanese Patent Application Laid-Open No. H8 (1996)-201807 has proposed an illumination optical system for liquid crystal display back lights which intentionally diffuses a luminous flux by uniformly dispersing, in the base material of the optical member, particles with different refractive indices which are not compatible with each other, thereby guiding the luminous flux to a desired direction with high efficiency.

Furthermore, Japanese Patent Application Laid-Open No. H11 (1999)-188268 has proposed a technique for providing a refractive index distribution by including a metal oxide inside a glass tube and gradually changing the content of the metal oxide inside the glass tube from the inner surface side.

As mentioned above, electronic devices such as digital cameras are increasingly downsized and the illumination optical systems incorporated in such devices must be also miniaturized. However, even with the use of the above-described technique, it is difficult to achieve further miniaturization of the illumination optical system, while maintaining their existing optical characteristics.

More specifically, PMMA (polymethyl methacrylate), which has excellent optical characteristics and sufficient mechanical strength as an exterior member, is widely used at present as the material of an optical member constituting an illumination optical system. The refractive indices of major optical resin materials, including PMMA, used as optical members are approximately 1.5.

However, in order to achieve miniaturization of the illumination optical system, it is essential to use a material having a higher refractive index than ordinary resin materials.

On the other hand, in the optical system as disclosed in Japanese Patent Application Laid-Open No. H10 (1998)-115852 or Japanese Patent Application Laid-Open No. 2000-250102, the distance between the light source and the optical member is extremely short. This presents the possibility that some optical materials may be deformed or discolored by heat generated by the light source and thus may be unable to maintain the shape, optical characteristics and the like of the optical member. In view of such situation, it is necessary to take into consideration not only a high refractive index, but also heat generated by the light source, when selecting the optical material.

Further, in each of the optical systems proposed in Japanese Patent Application Laid-Open No. H11 (1999)-345512 and Japanese Patent Application Laid-Open No. H8 (1996)-201807, relatively large, transparent elementary particles having a thickness of several micrometers and a refractive power different from that of the base material of the optical member are dispersed. However, this is basically aimed at uniformly diffusing light, and cannot simultaneously improve the optical characteristics, mechanical characteristics and the like of the optical member.

Additionally, the light source proposed in Japanese Patent Application Laid-Open No. H11 (1999)-188268 is extremely expensive as it uses glass as the base material, and a refractive index gradient is provided for the glass tube, which serves as the light source. Therefore, the proposal does not relate to the optical member which exerts an optical action on the luminous flux emitted from the light source.

SUMMARY OF THE INVENTION

It is an object of the present invention to provide an illumination optical system which can achieve further miniaturization by improving the characteristics of the material of the optical member, in addition to the shape of the optical member.

In order to achieve the above-described object, an illumination optical system according to one aspect of the present invention comprises a light source and an optical member disposed in a direction of irradiation of light from the light source. The optical member is made of a particle-containing material with particles having a particle size of less than 1 µm contained in a base material made of a resin material.

These and further objects and features of the illumination optical system and the image-taking apparatus according to the present invention will become apparent from the following detailed description of preferred embodiments thereof taken in conjunction with the accompanying drawings.

BRIEF DESCRIPTION OF THE DRAWINGS

FIG. 1A shows a vertical cross-sectional view of an illumination optical system according to Embodiment 1 of the present invention, and FIG. 1B shows a diagram in which a traced drawing of light beams has been added to FIG. 1A.

FIG. 2A shows a vertical cross-sectional view of a conventional illumination optical system, and FIG. 2B shows a diagram in which a traced drawing of light beams has been added to FIG. 2A.

FIG. 10A shows a vertical cross-sectional view of a conventional illumination optical system, and FIG. 10B shows a diagram in which a traced drawing of light beams has been added to FIG. 10A.

DETAILED DESCRIPTION OF THE PREFERRED EMBODIMENTS

Embodiments of the present invention are described below, with reference to the accompanying drawings.

Embodiment 1

Figure 3:
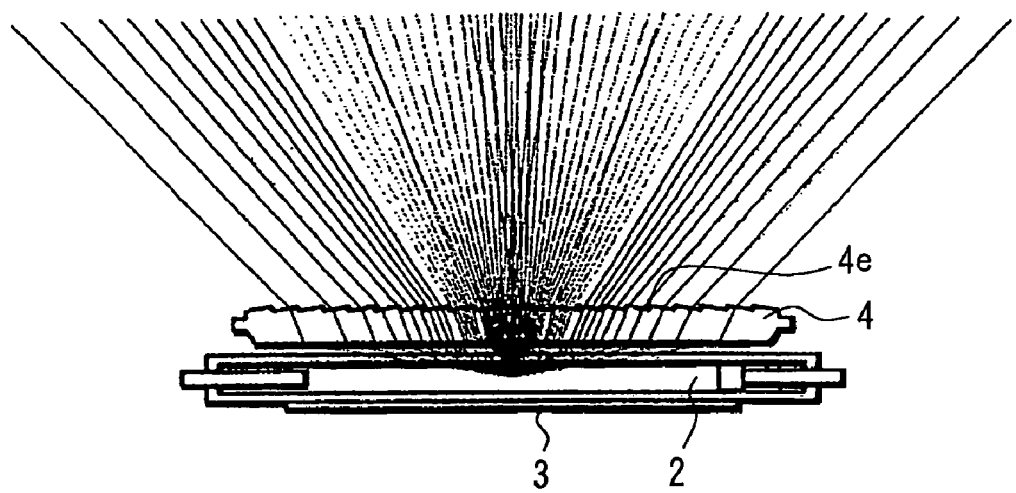
FIG. 3 shows a horizontal cross-sectional view of the illumination optical system according to Embodiment 1 of the present invention.
Figure 5:
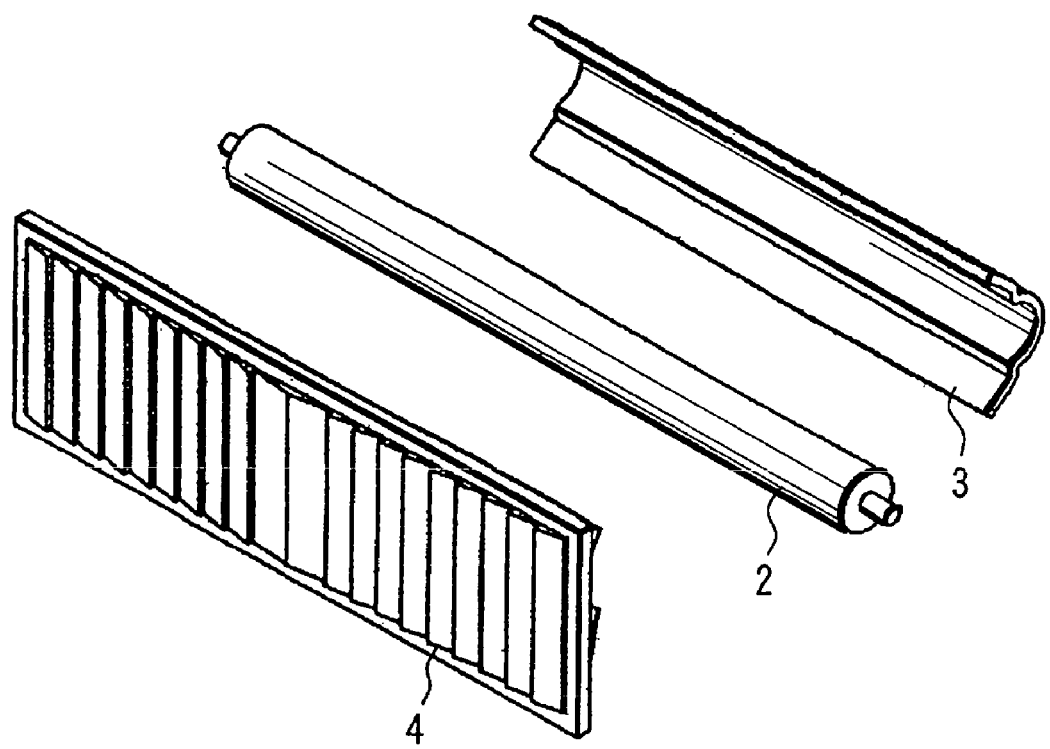
FIG. 5 shows an exploded perspective view of the illumination optical system according to Embodiment 1 of the present invention.
Figure 6:
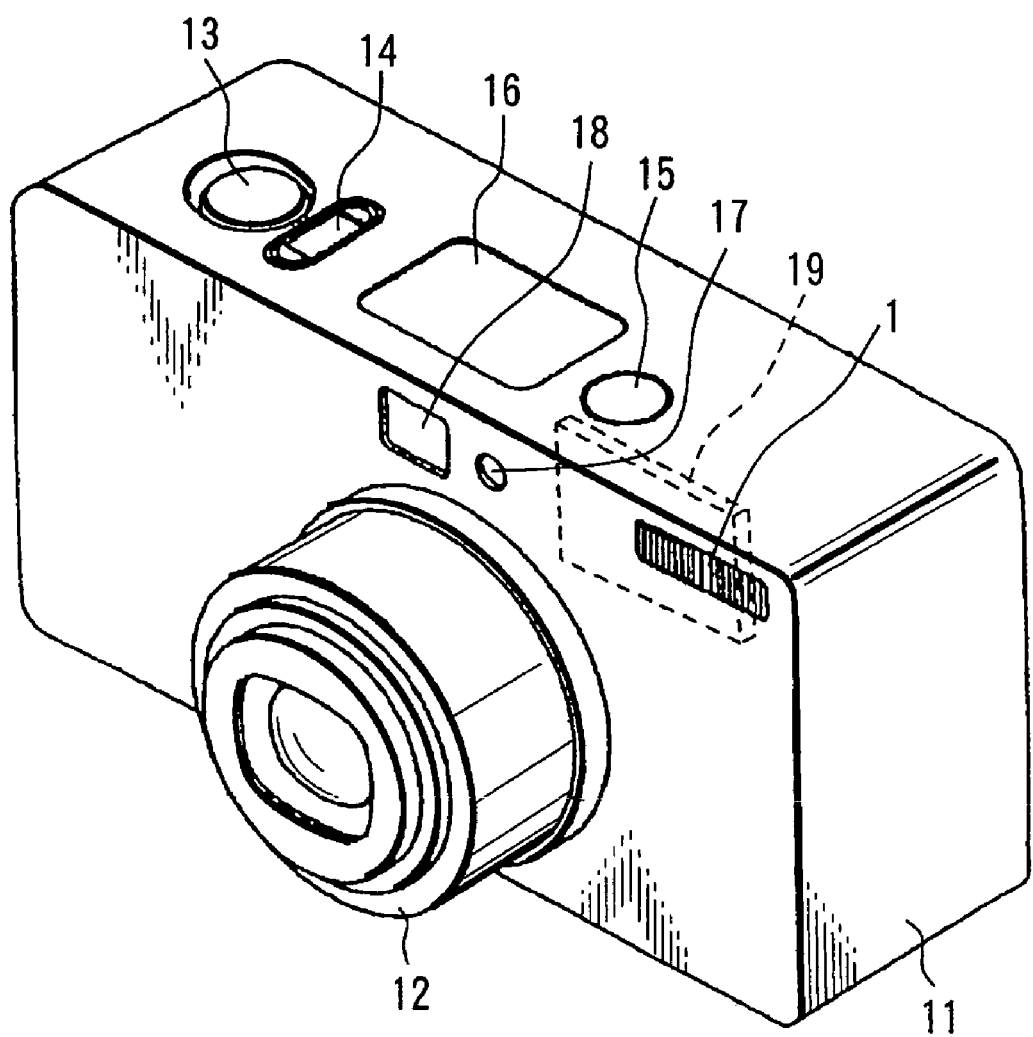
FIG. 6 shows a perspective view of a camera equipped with the illumination optical system according to Embodiment 1 of the present invention.

FIGS. 1, 3 and 5 show the structure of an illumination optical system according to Embodiment 1 of the present invention, in particular, an illumination optical system incorporated in a camera (image-taking apparatus). FIGS. 1A and B show cross-sectional views (vertical cross-sectional views) in a direction orthogonal to the optical axis of the illumination optical system, and FIG. 3 shows a horizontal cross-sectional view of the illumination optical system. FIGS. 1B and 3 also show traced drawings of light beams for representative light beams emitted from the center of the light source. FIG. 5 shows an exploded perspective view of the illumination optical system. FIG. 6 shows a camera equipped with the illumination optical system.

Referring first to FIG. 6, reference numeral 11 denotes a camera body, and 12 denotes an image-taking lens barrel disposed approximately at the center on the front of the camera body 11. Reference numeral 1 denotes an illumination unit which uses the illumination optical system according to this embodiment and is placed on the upper right when viewed from the front of the camera body 11.

Reference numeral 13 denotes a release button for allowing an image-pickup element 19, such as a CCD or a CMOS sensor, provided inside the camera body 11, to take an image of an object by photoelectric conversion (or taking an image with a film). Reference numeral 14 denotes a zooming switch for zooming the image-taking lens. Depressing the zooming switch 14 frontward permits zooming in the telephoto direction, and depressing it backward permits zooming in the wide-angle direction.

Reference numeral 15 denotes an operation button for switching between various modes of the camera, and 16 denotes a liquid crystal display panel for informing the user of the operation of the camera. Reference numeral 17 denotes a light-receiving window of a photometric unit which measures the brightness of external light (the object), and 18 denotes an inspection window of a finder. It should be noted that the illumination optical system of the present invention can be incorporated not only into the camera shown in FIG. 6, but also into other cameras (e.g., a single-lens reflex camera and a video camera).

In the following, the structural components which determine the optical characteristics of the illumination optical system according to this embodiment are described with reference to FIGS. 1, 3 and 5.

In these figures, reference numeral 2 denotes a light-emitting discharge tube (xenon tube) in the shape of a cylindrical straight tube. Reference numeral 3 denotes a reflector (refection member) which reflects, to the front of the illumination unit, those components of the luminous flux emitted from the light-emitting discharge tube 2 which travel to the rear in a direction of the irradiation optical axis L (to the opposite side to the irradiation direction of the illumination optical system) and those components which travel in the vertical direction. The reflector 3 is made of, for example, a metallic material, such as radiant aluminum, having a high-reflectance inner surface, or a resin material having an inner surface on which a high-reflectance metal-evaporated surface is formed.

Reference numeral 4 denotes an optical member integrally formed from a transparent material. At the portion of the incidence surface of the optical member 4 which is located in the vicinity of the irradiation optical axis L (hereinafter, simply referred to as "optical axis") (the vicinity of the center), a cylindrical lens surface (positive refraction portion) 4a is formed which has positive refractive power in a direction substantially orthogonal to the longitudinal direction of the light-emitting discharge tube 2 (in the vertical direction). Further, at the upper and lower peripheral portions of the cylindrical lens surface 4a in the vertical direction, a pair of prism portions (reflecting portions) are formed which have refracting surfaces (incidence surfaces) 4b and 4b' and reflecting surfaces 4c and 4c'. A luminous flux which has entered from the cylindrical lens surface 4a, and a luminous flux which has entered from the incidence surfaces 4b and 4b' and then has been reflected by the reflecting surfaces 4c and 4c' are emitted from the same exit surface 4d to the irradiation surface.

Conventionally, optical organic polymer materials having a high transmissivity, such as polymethyl methacrylate (PMMA), have been used as the material of the optical member 4. This is because they are less expensive, lighter and easier to form than glass, ceramics and the like. However, in order to achieve further miniaturization, while improving the optical characteristics, this embodiment uses a nanocomposite obtained by dispersing nano-scale, ultrafine inorganic particles in an organic polymer material serving as a base material, or a hybrid resin material obtained by covalently bonding molecules of an organic polymer material serving as a base material and molecules of nano-scale, ultrafine inorganic particles.

In such an organic-inorganic composite material, for example, ultrafine inorganic particles (inorganic nanoparticles) of 30 nanometers or smaller are uniformly dispersed in the base material, so that the transmissivity loss resulting from Raleigh scattering or the like can be suppressed, maintaining high transparency. Moreover, since there is a wide range of selections for the polymer material serving as the base material and the inorganic nanoparticles, the organic-inorganic composite material can achieve various refractive indices and can be applied to a variety of forming (molding) processes. Further, the refractive index can be freely changed by varying the concentration distribution of the inorganic nanoparticles, even when the same materials are combined. Furthermore, the above-described composite material can be closely attached or applied to a variety of materials having different refractive indices, making it possible to control the change in the overall refractive index.

Typical examples of the inorganic nanoparticles include niobium oxide ($Nb_2O_5$) nanoparticles and titanium oxide (TiO) nanoparticles. The refractive index of a single fine particle of each of these compounds is as high as 2.3. Therefore, the overall refractive index of the optical member 4 can be significantly increased by dispersing the inorganic nanoparticles in the organic material serving as the base material of the optical member 4, even when the refractive index of the organic material is as low as about 1.5.

As described above, the nanocomposite or the hybrid material of inorganic fine particles and an optical resin has unprecedented excellent characteristics (e.g., transparency, heat resistance, mechanical strength, surface hardness and moldability). This embodiment achieves significant miniaturization and performance improvement of the illumination optical system by utilizing these characteristics.

In addition, the content of the inorganic fine particles in the base material (the organic polymer material) can be appropriately selected, but the above-described effects are remarkable when the content is 20 wt % to 30 wt % or more. Further, it seems that it is possible to achieve the above-described effects, while maintaining the necessary transmissivity, when the content is 50 wt % or more. Particularly, since the ultrafine particles as described in the present invention have an extremely small particle size (average particle size) of 1 μm or less, it is possible to easily increase their content, while maintaining the necessary transmissivity. That is, it is possible to easily increase the refractive index. Furthermore, it seems that particles with a particle size of 400 to 700 nm or less, which is the wavelength range of visible light, in particular ultrafine particles with a particle size of 100 nm or less, which is sufficiently smaller than the wavelength of visible light, do not interfere the propagation (i.e., hardly cause the diffusion) of illumination light. Therefore, it is highly possible to realize an optical material having both a high transmissivity and a high refractive index.

The advantages in using the above-described material of the illumination optical system of the present invention (the present embodiment) are listed below.

1. The refractive index can be set higher than in conventional resin materials, thus simplifying the shape of the illumination optical system. More specifically, the optical member for forming an equivalent condensing optical system can be reduced in its thickness in the optical axis direction, so that the overall shape of an optical system can be miniaturized into a form which can be easily processed. Furthermore, when the illumination optical system using the above-described material is provided with the same refracting effect as an illumination optical system using the conventional material, the curvatures of the optical surfaces can be set more gentle, making it possible to minimize the loss caused by surface reflections when light enters and exit from the optical member.

2. Using the above-described material provides higher heat resistance than using the base material alone, so that the optical member can be disposed close to the light source. As a result, it is possible to achieve further miniaturization of the overall shape of the optical system.

3. Using the above-described material provides higher flowability than using the base material alone, so that an optical material with an intricate shape can be formed easily. Furthermore, the design flexibility can be increased.

4. The above-described material can be easily colored, and suffers less optical loss. The light quantity loss can be repressed better than with a pigment-based color correction.

As described above, the use of the above-described material in the present invention is expected to achieve a number of characteristics which are optically advantageous.

When the operation mode is set, for example, to "flash auto mode" in a camera or an illumination optical system having the above-described structure, a central processing unit (not shown) determines whether light should be emitted from the illumination unit 1 or not based on the brightness of the object measured by a photometer (not shown) and the sensitivity of the image-pickup element 19 (or the film), after the release button 13 is pressed by the user.

When the central processing unit determines that "light should be emitted from the illumination unit" during image taking, the central processing unit outputs a flash signal and allows the light-emitting discharge tube 2 to emit light from a light emission control circuit (not shown) through a trigger lead wire attached to the reflector 3.

Of the luminous flux emitted from the light-emitting discharge tube 2, the luminous flux component emitted backward in a direction of the optical axis L and the luminous flux component emitted in the vertical direction enter the optical member 4 placed in front of the light-emitting discharge tube 2 via reflecting at the reflector 3, and the luminous flux component emitted forward in a direction of the optical axis L directly enters the optical member 4. Thereafter, these luminous flux components are converted to luminous flux components having predetermined light distribution characteristics (light irradiation characteristics) by the optical member 4, and then irradiated onto the object side.

In the following, an optimal method for setting, in the illumination unit 1, the illumination optical system according to this embodiment, which is smaller than the conventional illumination optical system and is capable of uniformly irradiating illumination light in the required irradiation range with high efficiency, is described with reference to FIGS. 1 to 4.

FIGS. 1A and B are diagrams showing a basic concept for optimizing the light distribution characteristics in the vertical direction of the illumination optical system of this embodiment, and FIGS. 2A and B show a conventional illumination optical system for comparison with this embodiment. In addition, FIGS. 1A and B and FIGS. 2A and B show the shapes at the same cross-section, and FIGS. 1B and 2B are diagrams in which traced drawings of light beams have been added to FIGS. 1A and 2A, respectively.

In these figures, reference numerals 2 and 102 denote light-emitting discharge tubes, and the inner and outer diameters of the glass tubes of the light-emitting discharge tubes are shown. In an actual light-emitting phenomenon of the light-emitting discharge tube of an illumination optical system of this type, light is often emitted from the full inner diameter to improve the efficiency, and it is reasonable to consider that light is emitted substantially uniformly from light-emitting points across the full inner diameter of the discharge tube. However, for simplicity of description, the luminous flux emitted from the center of the light-emitting discharge tube, i.e., the light source is regarded as a representative luminous flux and FIGS. 1B and 2B show only the representative luminous flux.

As actual light distribution characteristics, the light distribution characteristics as a whole changes in a direction in which a luminous flux spreads slightly due to a luminous flux emitted from the periphery of the light-emitting discharge tube in addition to the representative luminous flux emitted from the light source center as shown in FIGS. 1B and 2B, but this luminous flux has substantially identical light distribution characteristics, and therefore the following descriptions will be based on this representative luminous flux.

First, the shape of the portion of the reflectors 3 and 103 which is behind the light source center in a direction of the optical axis L is semi-cylindrical (hereinafter referred to as "semi-cylindrical portions 3a and 103a") and substantially concentric with the light-emitting discharge tubes 2 and 102. This shape is effective to return the light reflected by the reflectors 3 and 103 to the vicinity of the light source center, and has the effect of preventing adverse influences from refractions of the glass portions of the light-emitting discharge tubes 2 and 102.

Furthermore, such a structure makes it possible to handle the light reflected by the reflectors 3 and 103 as the exit (outgoing) light substantially equivalent to the direct light from the light source, thereby achieving miniaturization of the overall shape of the illumination optical systems following the reflectors.

The reason that the reflectors 3 and 103 have a semi-cylindrical shape is that having a size smaller than this will require the size of the optical members 4 and 104 to be increased to condense a luminous flux traveling in the vertical direction, while having a size larger than this will increase a luminous flux trapped inside the reflectors 3 and 103, resulting in a reduced efficiency.

On the other hand, the upper and lower peripheral portions 3b, 3b', 103b and 103b' of the reflectors 3 and 103 are shaped so as to extend along the reflecting surfaces 4c, 4c', 104c and 104c' of the optical members 4 and 104, thus allowing the luminous flux components which cannot be reflected by the reflecting surfaces and pass through these reflecting surfaces to be reflected at the peripheral portions 3b, 3b' 103b and 103b' and then to enter the optical members 4 and 104 again.

In the following, the shape of the optical member 4 is described which has the most significant influence on the light distribution characteristics of the illumination optical system according to this embodiment. In order to obtain the smallest possible optical member 4 capable of achieving a uniform light distribution in the required irradiation range, this embodiment adopts the following structure.

First, as shown in FIG. 1A, in the vicinity of the optical axis L (the vicinity of the center) on the incidence surface side of the optical member 4, a cylindrical lens surface 4a having positive refractive power in a plane orthogonal to the optical axis L is formed. Accordingly, those components of the luminous flux emitted from the light-emitting discharge tube 2 which travel in the vicinity of the optical axis L are converted to luminous flux components having uniform light distribution characteristics within a predetermined angle range and then emitted from the exit surface 4d of the optical member 4.

Here, in order to provide uniform light distribution characteristics, the cylindrical lens surface 4a of the optical member 4 is constructed to have a continuous non-spherical shape so that the angle of the light going out of the center of the light-emitting discharge tube 2 is proportional to the angle of the outgoing light which has passed through the optical member 4, and the incident luminous flux is condensed as a luminous flux within a certain irradiation angle range. This state can be understood by observing the vicinity of the optical axis L in the traced drawing of light beams shown in FIG. 1B.

In the following, of the luminous flux emitted from the center of the light-emitting discharge tube 2, those components which directly enter the refracting surfaces (incidence surfaces) 4b and 4b' at the upper and lower peripheral portions and have a large angle with respect to the optical axis L are described.

Here, the luminous flux traveling toward the upper and lower peripheral portions is made up of components which first enter from the incidence surfaces 4b and 4b' and then are reflected by the reflecting surfaces 4c and 4c'. By superposing the upper and lower components of this luminous flux with respect to the optical axis L after the luminous flux is reflected, the shape of the luminous flux is set such that the luminous flux has substantially the same irradiation angle range as a luminous flux incident on the cylindrical lens surface 4a and a uniform light distribution. The state of the light beams is as shown in the traced drawing of light beams shown in FIG. 1B.

Thus, as shown in FIG. 1B, it is possible to obtain an overall uniform light distribution for the required irradiation range. At this time, it is possible to control condensing (irradiation) by forming a completely separate optical path which is independent of the peripheral portions 4b and 4b' and the cylindrical lens surface 4a of the optical member 4.

On the other hand, of the luminous flux emitted from the light-emitting discharge tube 2 serving as the light source, the luminous flux components which directly enter the optical member 4 have been described above. However, the luminous flux components which have been emitted backward from the light-emitting discharge tube 2 are also emitted to the irradiation surface through substantially the same optical path. More specifically, since the shape of the central part of the reflector 3 is concentric with the light source center, the luminous flux emitted from the light source center is reflected by the reflector 3 and then refracted so as to return to the light source center. Thereafter, as described above, the luminous flux is converted to a component of the required irradiation angle by the action of the optical member 4 and irradiated onto the irradiation surface.

In the following, the effect of using a nanocomposite as the material of the optical member 4 in this embodiment is described with reference to FIGS. 2A and B. It should be noted that the optical member 104 shown in FIGS. 2A and B has the optimal shape in the case of using polymethyl methacrylate (PMMA: refractive index 1.492), which is widely used in ordinary illumination optical systems, and constitutes an illumination optical system having condensing characteristics (light irradiation characteristics) substantially equivalent to those of Embodiment 1 described above.

As is clear from a comparison between FIGS. 1 and 2, using a nanocomposite as the material of the optical member 4 makes it possible to significantly reduce the size of the optical member 4. In order to make a precise comparison of the sizes of the illumination optical systems, the light irradiation conditions in this embodiment other than the above-described material, such as the shapes of the light-emitting discharge tube 2 serving as the light source and of the reflector 3, the positional relationship between the light-emitting discharge tube 2 and each incidence surface of the optical member 4, and the light-emitting characteristics of the light-emitting discharge tube 2, are the same as those of the conventional optical system shown in FIGS. 2A and B, and a comparison was made solely between the shapes of the optical members 4 and 104.

The most significant difference between the illumination optical system of Embodiment 1 shown in FIG. 1 and the conventional illumination optical system shown in FIG. 2 is that the overall shape, in particular, the thickness in the depth direction of the illumination optical system of Embodiment 1 is much smaller. In the examples shown in the figures, the conventional illumination optical system shown in FIG. 2 requires the dimension d for the above-described thickness (in the figure, the thickness on the optical axis). In contrast, this embodiment requires the dimension D (<d) for the thickness in the optical axis direction, and can form an optical system having substantially equivalent condensing characteristics, with this small depth.

Thus, using a material with a high refractive index as the optical member makes it possible to form an extremely thin illumination optical system having substantially equivalent optical characteristics, thus facilitating miniaturization of the overall shape of the optical apparatus equipped with such an illumination optical system. Particularly, this embodiment has achieved about 40% reduction in the thickness of the optical member 4, whose shape is most significantly changed, by drastically increasing the refractive index of the optical material.

Furthermore, the optical system of this embodiment makes it possible not only to reduce the above-described thickness, but also to reduce the aperture height in the vertical direction so some extent. For example, whereas the conventional illumination optical system shown in FIG. 2B has the aperture height h, the illumination optical system according to this embodiment using an optical material with a high refractive index has the aperture height H (<h) (see FIG. 1A), and can form an optical system having substantially equivalent optical characteristics, with the aperture height H. Specifically, this embodiment has achieved about 5% reduction in the aperture height.

Thus, in this embodiment, of all the luminous flux components emitted from the center of the light-emitting discharge tube 2 in a direction substantially orthogonal to the longitudinal direction of the light-emitting discharge tube 2, the luminous flux component incident on the cylindrical lens surface 4a and the luminous flux component incident on the prism portions (the incidence surfaces 4b and 4b' and the reflecting surfaces 4c and 4c') shown in FIG. 1B are each converted to a luminous flux component having a uniform light distribution by the optical action of the optical surfaces, and their light distributions overlap with one another. This makes it possible to obtain overall uniform light distribution characteristics with high efficiency. Moreover, it is possible to achieve unprecedented miniaturization of the entire illumination optical system. Additionally, the curved surface of each part of the optical member can be formed smooth, so that it is possible to not only improve the moldability, but also to minimize the decrease in light quantity when light passes through the resin material. Furthermore, it is possible to contribute to the reduction in the size and the weight of image-taking apparatuses and other optical apparatuses equipped with this illumination optical system.

In the following, a condensing action in the longitudinal direction of the light-emitting discharge tube 2 according to this embodiment is described with reference to FIGS. 3 and 4.

FIG. 3 shows a cross-sectional view of the illumination optical system, taken along through a plane including the central axis of the light-emitting discharge tube 2, and is accompanied by a traced drawing of light beams from the center in the longitudinal and radial directions of the light-emitting discharge tube 2. FIG. 4 shows an illumination optical system formed by a conventional material, for clarifying the present invention, and similarly to FIG. 3, is accompanied by a traced drawing of light beams from the center in the longitudinal and radial directions of the light-emitting discharge tube 102.

First, the structure of the conventional illumination optical system is described with reference to FIG. 4. It should be noted that the material of the optical member 104 shown in FIG. 4 is polymethyl methacrylate (PMMA: refractive index 1.492), which has a lower refractive index than the optical member 4 according to this embodiment.

Figure 4:
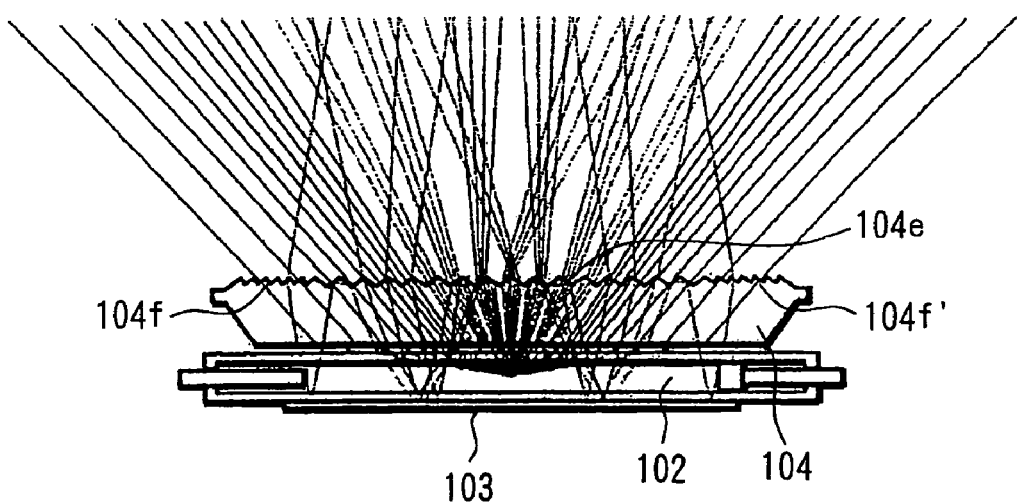
FIG. 4 shows a horizontal cross-sectional view of the conventional illumination optical system.

As shown in FIG. 4, the exit surface of the optical member 104 is made up of prism portions 104e having two slopes of the same angle which are formed in the vicinity of the center in the longitudinal direction of the discharge tube 2 and Fresnel lens portions 104f and 104f' formed in the periphery. The prism portions 104e located in the vicinity of the center of the optical member 104 formed as described above have the effect of allowing luminous flux components with a relatively large angle of incidence (luminous flux components with an angle of incidence within the prism portions ranging from about 30° to 40°) to go out of the exit surface at the same angle at which light is refracted through the incidence surface, that is, allowing luminous flux components to go out of the exit surface without being affected by refraction on the exit surface, having the effect of condensing the incident luminous flux as a luminous flux within a certain range of irradiation angles.

On the other hand, a portion of the luminous flux components incident on the prism portions 104e is substantially totally reflected by the prism surface and returned to the discharge tube 102 again. This luminous flux component is reflected by the reflector 103, entered into the optical member 104 again, then is converted to a predetermined angle component by the prism portions 104e or by the Fresnel lens portions 104f and 104f', and irradiated onto an object surface.

Thus, most of the components of the luminous flux emitted from the center of the discharge tube 102 are converted to luminous flux components with a certain angle distribution and emitted from the optical member 104. In this case, the light distribution of the illumination light is solely dependent on the angle setting of the apex angles of the prism portions 104e and is not affected by the pitch, etc., of the prism portions 104e. This allows condensing control in an extremely shallow area without the need for the depth in a direction of the optical axis L, thus making it possible to miniaturize the entire illumination optical system.

Furthermore, as shown in the figure, the Fresnel lens portions 104f and 104f' are formed in the periphery on the exit surface of the optical member 104. Although the optical member 104 is thin, there is an area in the periphery where a luminous flux with certain directivity is obtained, and forming the Fresnel lens portions in this area allows relatively efficient condensing action. In FIG. 4, no conspicuous condensing action in this area is observable. This is because only the luminous flux emitted from the center of the light-emitting discharge tube 102 is shown, and a significant portion of the luminous flux emitted from the vicinity of terminal portions on both ends of the light-emitting discharge tube 102 is converted to components which concentrate in the vicinity of the optical axis L.

Thus, when a material with a relatively low refractive index is used as the optical material of the optical member 104, appropriately determining the shape of the exit surface of each portion of the optical member 104 allows even an extremely thin optical system disposed near the light-emitting discharge tube 102 to condense a illumination luminous flux within a certain angle range with high efficiency. However, when a material with a high refractive index is used as the optical material as in this embodiment, it is not possible to adopt the optical structure shown in FIG. 4. This is because, when a material with a high refractive index is used as the optical member, a luminous flux incident on the optical member tends to be totally reflected inside the optical member and therefore is difficult to exit from a surface intended as the exit surface. For this reason, the exit surface of the optical member cannot be formed as a curved surface with an acute curvature, or, a prism surface or Fresnel lens surface with a steep angle, and is preferably formed as a Fresnel lens 4e with weak refractive power, as shown in FIG. 3.

In view of this, the Fresnel lens 4e with a weak refractive power is formed on the exit surface of the optical member 4 in this embodiment. Furthermore, the angles of the Fresnel lens 4e are set at an almost constant angle in this embodiment. With such a structure, it is possible to minimize adverse effects by total reflection when a material with a high refractive index is used, while allowing an efficient condensing operation.

In this embodiment, the cylindrical lens surface 4a of the optical member 4 is constructed to have a continuous aspherical shape so that a proportional relationship is established between the angle of outgoing light from the center of the light-emitting discharge tube 2 and the angle of outgoing light that has passed through the optical member 4. However, the shape of the cylindrical lens surface 4a is not limited to an aspherical shape, and a cylindrical lens surface with a certain curvature which approximates an aspherical shape, or a toric surface having a curvature in the longitudinal direction of the light source may also be used.

Furthermore, a case is shown in this embodiment where each surface structure on the incidence surface side and each surface structure on the exit surface side of the optical member 4 are symmetric with respect to the optical axis L, but this embodiment is not limited to such a symmetric structure.

For example, the prism portions 4b and 4c and 4b' and 4c' on the incidence surface side of the optical member 4 are symmetric with respect to the optical axis L. However, they are not necessarily formed in such a structure, and may be asymmetric. This applies not only to the prism portions, but also to the cylindrical surface 4a in the central portion.

Furthermore, also for the Fresnel lens portion 4e formed in the center in the longitudinal direction of the discharge tube on the exit surface side, each angle of the Fresnel lens does not necessarily be constant, and may be gradually changed. Alternatively, a Fresnel lens with different angle settings for its right and left sides may be used.

Embodiment 2

Figure 7:
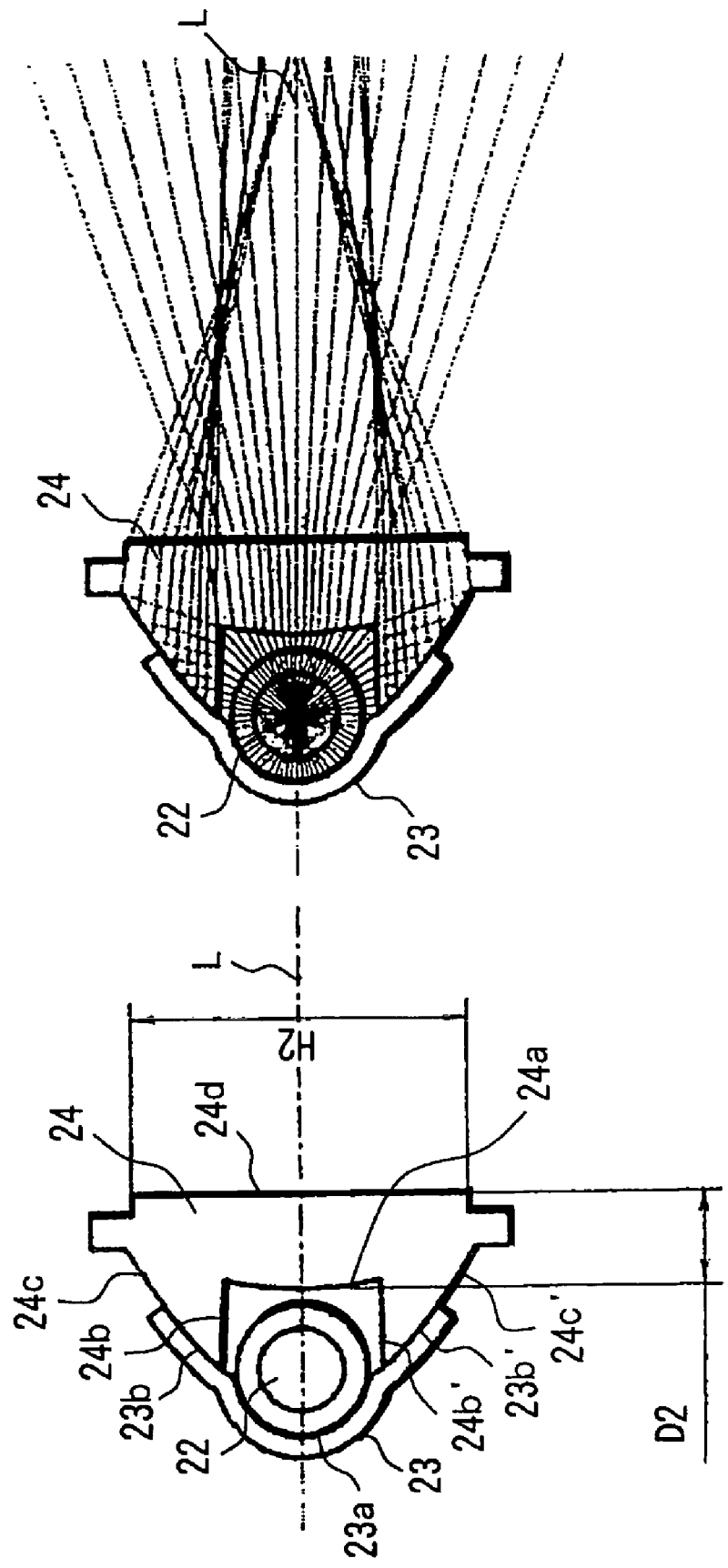
FIG. 7A shows a vertical cross-sectional view of an illumination optical system according to Embodiment 2 of the present invention.
FIG. 7B shows a diagram in which a traced drawing of light beams has been added to FIG. 7A.

FIGS. 7A and B show an illumination optical system according to Embodiment 2 of the present invention. Similarly to Embodiment 1, this illumination optical system is used for illumination units incorporated in cameras. It should be noted that this embodiment is an example of a partial modification of Embodiment 1, and the figures show only the vertical cross-sectional views corresponding to those shown in FIG. 1 of Embodiment 1. Since the basic structure is substantially the same as that of Embodiment 1, the overlapping components are only briefly described. In addition, FIGS. 7A and B show the shapes at the same cross section, and FIG. 7B is a diagram in which a traced drawing of light beams for representative light beams emitted from the light source center has been added to FIG. 7A.

In FIGS. 7A and B, reference numeral 22 denotes a light-emitting discharge tube (xenon tube), and 23 denotes a reflector. The reflector 23 is formed in substantially the same shape as the reflector 3 of Embodiment 1. More specifically, the shape of the portion of the reflectors 23 which is behind the light source center in a direction of the optical axis L is semi-cylindrical (hereinafter referred to as "semi-cylindrical portion 23a") and substantially concentric with the light-emitting discharge tubes 22. Further, peripheral portions 23b and 23b' of the reflector 23 are smaller, but have substantially the same shape as in Embodiment 1, and formed so as to extend along the rear of reflecting surfaces 24c and 24c' of an optical member 24. The peripheral portions 23b and 23b' reflect a luminous flux which cannot be totally reflected at the reflecting surfaces 24c and 24c' and allow it to enter the optical member 24 again.

Then, as can be seen from the shapes shown in the figures, the distance between the light-emitting discharge tube 22 serving as the light source and each of incidence surfaces 24a, 24b and 24b' of the optical member 24 is shortened in this embodiment as compared with Embodiment 1, achieving further miniaturization of the entire illumination optical system.

Additionally, similarly to Embodiment 1 described above, this embodiment uses, as the material of the optical member 24, a nanocomposite obtained by uniformly dispersing fine inorganic particles (inorganic nanoparticles) with a particle size of several tens of nanometers or less in a base material made of an organic material.

One known characteristic of this nanocomposite is that an optical member using this composite provides higher heat resistance than an optical member made of only a base material. For example, an optical member obtained by containing silica particles (about 10 nanometers) in polymethyl methacrylate (PMMA) increases the heat resistance by about 10° to 30°, and the heat resistant temperature increases with an increase in the content of the fine particles. Thus, an optical member using a nanocomposite as the optical material provides higher heat resistance than an optical member formed by molding a conventional optical material. This characteristic is very important for an illumination optical system which is the subject of the present invention, and is very effective in further miniaturization of an illumination optical system to a size which used to be considered as the limit of the conventional structure.

That is, in general, a large amount of heat is often generated together with light when light is generated from a light source. Therefore, using a material with increased heat resistance as an optical member makes it possible to dispose a light-emitting discharge tube serving as the light source and an optical member closer to each other than in the conventional structure. As a result, it is possible to achieve significant miniaturization of the entire illumination optical system.

In the following, the shape of the illumination optical system according to this embodiment is described in detail with reference to FIG. 7A and the traced drawing of light beams shown in FIG. 7B. In these figures, reference numeral 22 denotes a light-emitting discharge tube, and the inner and outer diameters of the glass tube of the light-emitting discharge tube 22 are shown. Similarly to Embodiment 1, for simplicity of description, the luminous flux emitted from the light source center is regarded as a representative luminous flux and FIG. 7B show only the representative luminous flux. The following descriptions will be based on this representative luminous flux.

As shown in FIG. 7A, of the luminous flux emitted from the light-emitting discharge tube 22, the luminous flux component traveling toward the vicinity of the optical axis L of (the vicinity of the center of) the optical member 24 enters the cylindrical lens surface 24a having positive refractive power and is condensed by the cylindrical lens surface 24a. On the other hand, the luminous flux component traveling toward a position (the periphery) away from the optical axis L of outgoing light from the optical member 24 enters from the incidence surfaces 24b and 24b' disposed above and below the cylindrical lens surface 24a, and is totally reflected at the reflecting surfaces 24c and 24c' constituting prism portions, and condensed by the reflecting surfaces 24c and 24c'. The luminous flux component which has entered the cylindrical lens surface 24a and the luminous flux component which has entered from the incidence surfaces 24b and 24b' and has then been reflected at the reflecting surfaces 24c and 24c' exit from the same exit surface 24d toward the irradiation surface.

Here, in view of the improved heat resistance of the material of the optical member 24, the incidence surfaces 24a, 24b and 24b' in this embodiment are disposed at positions closer to the light-emitting discharge tube 22 than in Embodiment 1 (FIG. 1). Accordingly, the overall shape of the illumination optical system can be made smaller than Embodiment 1 by an amount corresponding to the reduced distance between the optical member 24 and the light source.

Further, as shown in the traced drawing of light beams in FIG. 7B, the illumination optical system of this embodiment can achieve light distribution characteristics (light irradiation characteristics) substantially equivalent to those of Embodiment 1 and the illumination optical system using the conventional optical material shown in FIG. 2.

On the other hand, as described above, the luminous flux component emitted backward from the center of the light-emitting discharge tube 22 is reflected by the semi-cylindrical portion 23a of the reflector 23, passes through the center of the discharge tube 22 again, and is then emitted forward. The behavior of the luminous flux component thereafter is the same as that shown in the traced drawing of light beams in FIG. 1B.

The most significant difference between this embodiment and the conventional illumination optical system shown in FIG. 2 is that the overall shape, in particular, the thickness in the depth direction of the illumination optical system of this embodiment is much smaller (than Embodiment 1). In the examples shown in the figures, the conventional structure shown in FIG. 2 requires the dimension d for the thickness of the optical member on the optical axis. In contrast, this embodiment requires the dimension D2 (<D<d) for the thickness in the optical axis direction, and can form an optical system having characteristics substantially equivalent to those of Embodiment 1 and the optical system having the conventional structure, with this depth.

Thus, using a material with a high refractive index as the optical member makes it possible to form an extremely thin illumination optical system having substantially equivalent optical characteristics, thereby facilitating miniaturization of the overall shape of an optical apparatus. Particularly, this embodiment has achieved about 45% reduction in the thickness of the optical member 24, whose shape is most significantly changed, by drastically increasing the refractive index of the optical material.

On the other hand, the illumination optical system of this embodiment achieves not only reduction in the above-described thickness, but a significant reduction in the aperture height in the vertical direction as well. In the examples shown in the figures, whereas the conventional structure shown in FIG. 2 requires the aperture height h, this embodiment using an optical material with a higher refractive index requires the aperture height H2 (<H<h) to form an optical system having substantially equivalent optical characteristics. Accordingly, this embodiment has achieved about 25% reduction in the aperture height.

Thus, in this embodiment, of the luminous flux emitted from the center of the light-emitting discharge tube 22 in a direction substantially orthogonal to the longitudinal direction of the light-emitting discharge tube 22, the component incident on the cylindrical lens surface 24a and the component incident on the prism portions (the incidence surfaces 24b and 24b' and the reflecting surfaces 24c and 24c') shown in FIG. 7A are each converted to a luminous flux component having a uniform light distribution by the optical actions of the optical surfaces, and their light distributions overlap with one another. This makes it possible to obtain overall uniform light distribution characteristics with high efficiency, while achieving unprecedented miniaturization of the overall shape of the illumination optical system.

Additionally, the curved surface of each portion of the optical member 24 can be formed smooth, so that it is possible not only to improve the moldability, but also to minimize the decrease in light quantity when light passes through the resin material. Furthermore, it is possible to contribute to the reduction in size and weight of an image-taking apparatus and other optical apparatuses equipped with this illumination optical system.

It should be noted that the shape of the light-emitting discharge tube 22 in the longitudinal direction in this embodiment is the same as that of Embodiment 1.

As described above, similarly to Embodiment 1, this embodiment makes it possible to construct a small, thin and highly efficient illumination optical system which suffers little loss of light quantity resulting from irradiation to the outside of the required irradiation range, using only a few structural components, namely the reflector 23 and optical member 24.

Moreover, in this embodiment, the peripheral portions 23b and 23b' of the reflector 23 are extended to positions covering the rear of the light-emitting discharge tube 22, so that it is possible to construct a illumination optical system which utilizes the energy of light emitted from the discharge tube 22 more effectively.

Embodiment 3

Figure 8:
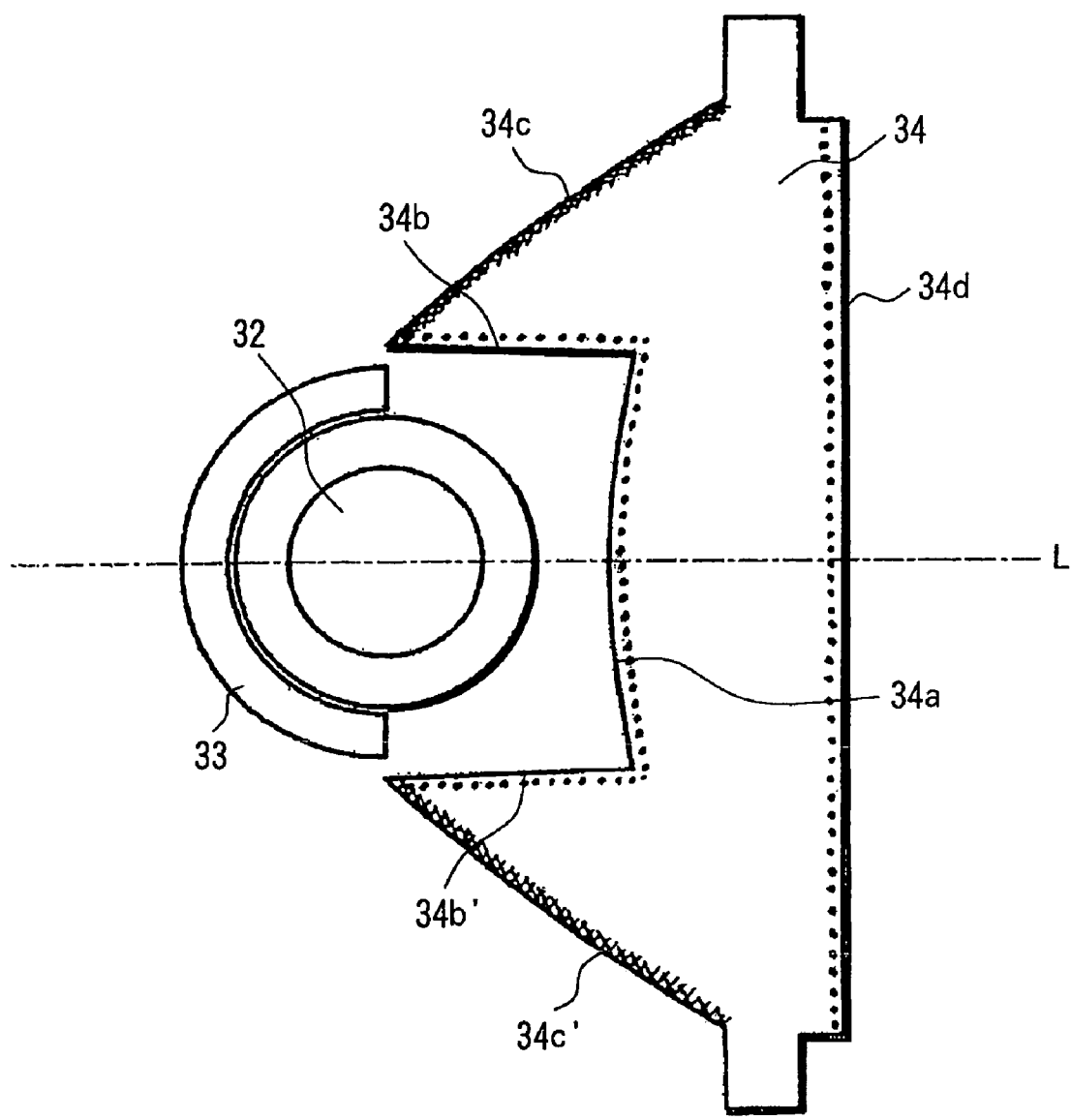
FIG. 8 shows a vertical cross-sectional view of an illumination optical system according to Embodiment 3 of the present invention.

FIG. 8 shows an illumination optical system according to Embodiment 3 of the present invention. Similarly to Embodiment 1, this illumination optical system is used for illumination units incorporated in cameras. This embodiment is substantially equivalent to Embodiment 1 in terms of the shape, but the concentration distribution of ultrafine inorganic particles of a nanocomposite used as the material of the optical member is partially biased in order to take the full advantage of the characteristics of the nanocomposite. That is, whereas various optical and mechanical characteristics of the optical material of the optical members 2 and 24 described in Embodiments 1 and 2 are improved by uniformly dispersing the ultrafine inorganic particles in the base material, the optical characteristics of this embodiment are further improved by locally varying the concentration distribution within the optical member, more specifically, by varying the concentration in the vicinity of the surface of the optical member with respect to the concentrations in the remaining portions. In addition, the optical member can be produced relatively easily by varying the content concentration of the ultrafine particles in the vicinity of the surface of the optical member.

In FIG. 8, reference numeral 32 denotes a light-emitting discharge tube serving as a light source, and 33 denotes a reflector which reflects forward, a luminous flux component traveling backward from the light-emitting discharge tube 32. Unlike Embodiments 1 and 2, the reflector 33 of this embodiment is made up solely of a semi-cylindrical reflecting surface.

Reference numeral 34 denotes an optical member, in which the concentration distribution of the ultrafine particles is partially varied, as described above. The optical member 34 is made up of the following portions.

At the portion of the optical member 34 which is located in the vicinity of the optical axis L (the vicinity of the center), a cylindrical lens surface 34a having positive refractive power is formed, and an incoming luminous flux from the light-emitting discharge tube 32 is condensed by the cylindrical lens surface 34a. Furthermore, at the upper and lower positions (the peripheral portions) of the optical member 34 which are apart from the optical axis L of outgoing light from the optical member 34, incidence surfaces 34b and 34b' are disposed. A luminous flux incident from these incidence surfaces 34b and 34b' is totally reflected at reflecting surfaces 34c and 34c', and then condensed. It should be noted that the incidence surfaces 34b and 34b' and the reflecting surfaces 34c and 34c' constitute prism portions.

Furthermore, the luminous flux components which have been subjected to condensing control at the above-described optical surfaces are combined and then exit from the same exit surface 34d toward the irradiation surface. Here, a relatively low refractive index layer (shown as a group of small black dots in the figure), which is the base material of the optical member 34, is present in the vicinity of the surfaces (the incidence surfaces 34a, 34b and 34b') of the optical member 34. Similarly, a relatively low refractive index layer (shown as a group of small black dots in the figure), which is the base material of the optical member 34, is present in the vicinity of the exit surface 34d.

Thus, forming the surface of the optical member 34 on which light is incident or the surface of the optical member 34 from which light exits by a surface at which a base material with a relatively low refractive index is present (that is, making the concentration of the ultrafine particles lower in the vicinity of the incidence and exit surfaces than in the remaining portions) makes it possible to suppress light quantity loss resulting from surface reflections. This is because, in general, a loss of light quantity resulting from surface reflections which occurs when light enters or exits from an optical material can be reduced more successfully when the refractive index difference is small. By suppressing light quantity loss resulting from surface reflections, a limited luminous flux from the light-emitting discharge tube 32 can be used efficiently.

As a conventional method for effectively preventing surface reflections, a method has been known in which an anti-reflection film is formed on incidence and exit surfaces. However, using an anti-reflection film, which requires a special surface treatment step, as the optical members described in the embodiments of the present invention is too costly, and is therefore not practical in terms of mass production. Therefore, in order to reduce surface reflections without forming any special thin film, the concentration distribution of the ultrafine particles included in the nanocomposite is appropriately varied in this embodiment. That is, a low refractive index layer with a low concentration of the ultrafine particles is disposed in the vicinity of the incidence surfaces and of the exit surface of the optical member 34.

On the other hand, contrary to the incidence and exit surfaces, an area (shown as the area indicated by grid lines in the figure) in which the ultrafine particles are dispersed at a high concentration is formed in the vicinity of the reflecting surfaces 34c and 34c'. It is generally known that the higher the content concentration of ultrafine particles in a nanocomposite material, the higher the refractive index of the nanocomposite material.

In the following, the reasons that the refractive index of the optical material is made higher (the content concentration of the ultrafine particles is made higher) in the vicinity of the reflecting surfaces in this embodiment are described.

Another significant characteristic of the optical member 34 used in this embodiment is its ability to efficiently condense light by utilizing total reflection. Here, as shown in the traced drawing of light beams of FIG. 1B of Embodiment 1, the total reflection at the reflecting surfaces 4c and 4c' is effectively exerted on the luminous flux emitted from the light source center. However, not all the components of the luminous flux emitted from the light-emitting points located in front of the light source center (on the irradiation surface side) can be totally reflected by the reflecting surfaces 4c and 4c'. This is because the angles of incidence of these luminous flux components on the reflecting surfaces 4c and 4c' are smaller than the critical angle. For this reason, it has been necessary to dispose the peripheral portions 3b and 3b' of the reflector 3 so as to cover the rear of the reflecting surfaces 4c and 4c' of the optical member 4, and to allow a portion of the luminous flux which cannot be reflected at the reflecting surfaces 4c and 4c' and passes through the reflecting surfaces 4c and 4c' to enter the optical member 4 again, by utilizing the reflection at the peripheral portions 3b and 3b'. However, this structure is not necessarily preferable since components which exit from or enter the optical member 4 are present in the vicinity of the reflecting surfaces 4c and 4c', causing reduction in efficiency.

In this embodiment, the refractive index of the optical member 34 is made higher in the vicinity of the reflecting 34c and 34c' by rendering the concentration distribution of the ultrafine inorganic particles of the nanocomposite material in the optical member 34 nonuniform, thereby forming a structure in which as many of the luminous flux components as possible are totally reflected at the reflecting 34c and 34c' easily (i.e., the critical angle is decreased). Therefore, it is possible to decrease the luminous flux components escaping to the outside which cannot be reflected at the reflecting surfaces 34c and 34c' and pass through the reflecting surfaces 34c and 34c.

This makes it possible to relax the design constraints which have been conventionally imposed to utilize total reflection, thus increasing the design flexibility for the shape of the optical member. Furthermore, almost all the luminous flux components emitted from the light-emitting discharge tube 32 can be controlled by total reflection, so that it is not necessary to provide the reflecting surfaces (the peripheral portions 3b and 3b' in Embodiment 1) in the periphery of the reflector 33 and the shape of the reflector 33 can thus be significantly simplified as shown in FIG. 8. Consequently, it is possible to improve the performance of the optical system, while simplifying its shape at the same time.

Thus, this embodiment is provided with many advantageous characteristics by varying the concentration distribution of the ultrafine particles of the nanocomposite material used as the optical member 34 in the vicinity of the surface with respect to the concentration distributions in the remaining portions.

Although the concentration distribution of the ultrafine particles is varied in the vicinity of all of the incidence surfaces, the exit surface and the reflecting surfaces in this embodiment, the concentration distribution may not necessarily be varied in the vicinity of all of these surfaces, and the concentration distribution of the ultrafine particles may be varied only in the vicinity of some of the surfaces. Further, the form of the optical system is not necessarily limited to the form of the above-described embodiment, and the above-described technique may be applied to condensing lenses or condensing prisms with various shapes.

Although the concentration distribution of the ultrafine particles of the nanocomposite is varied in this embodiment, it is possible to further form a low refractive index thin film on the incidence and exit surfaces of the optical member, or to form a high refractive index thin film on the reflecting surfaces of the optical member.

Embodiment 4

Figure 9A:
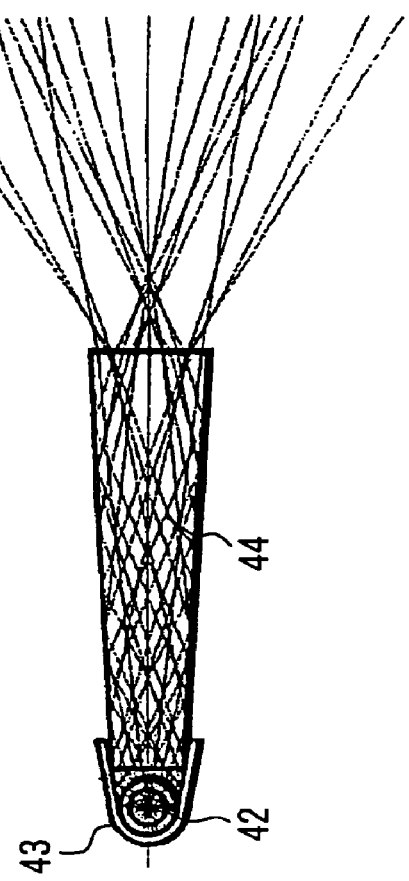
FIG. 9A shows a vertical cross-sectional view of an illumination optical system according to Embodiment 4 of the present invention.
Figure 9B:
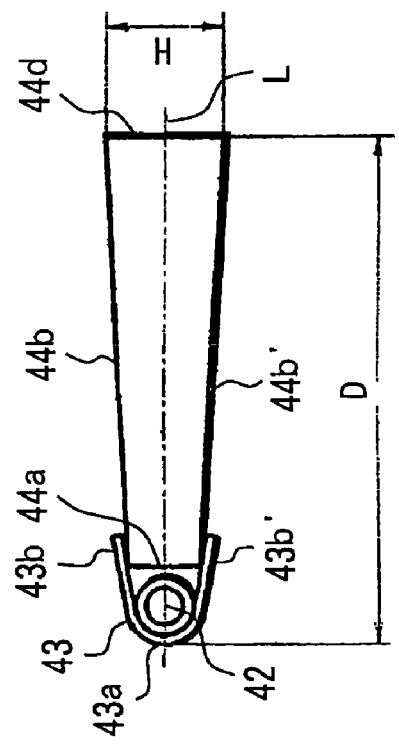
FIG. 9B shows a diagram in which a traced drawing of light beams has been added to FIG. 9A.
Figure 11:
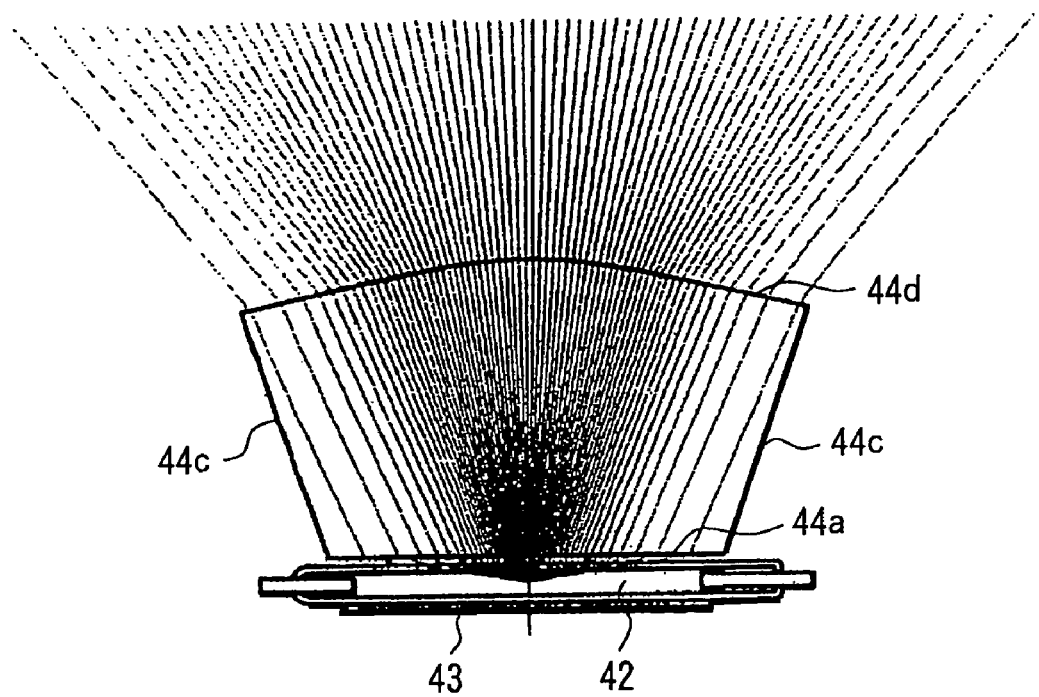
FIG. 11 shows a horizontal cross-sectional view of the illumination optical system according to Embodiment 4 of the present invention.
Figure 13:
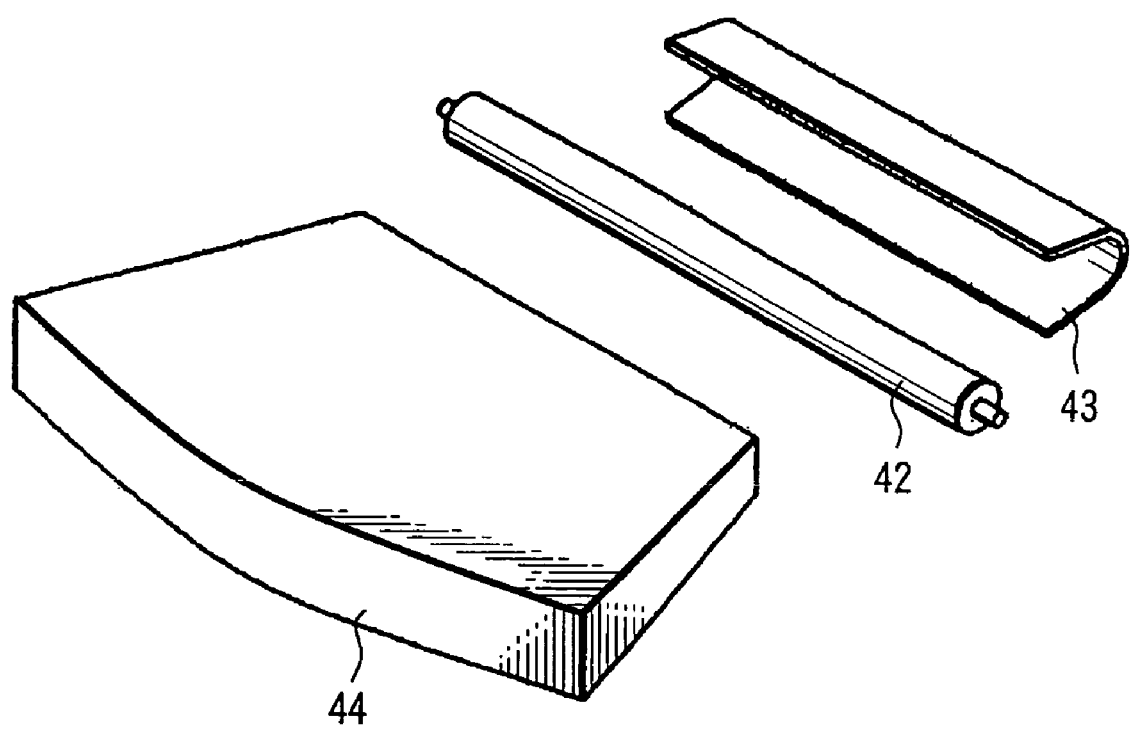
FIG. 13 shows an exploded perspective view of the illumination optical system according to Embodiment 4 of the present invention.
Figure 14:
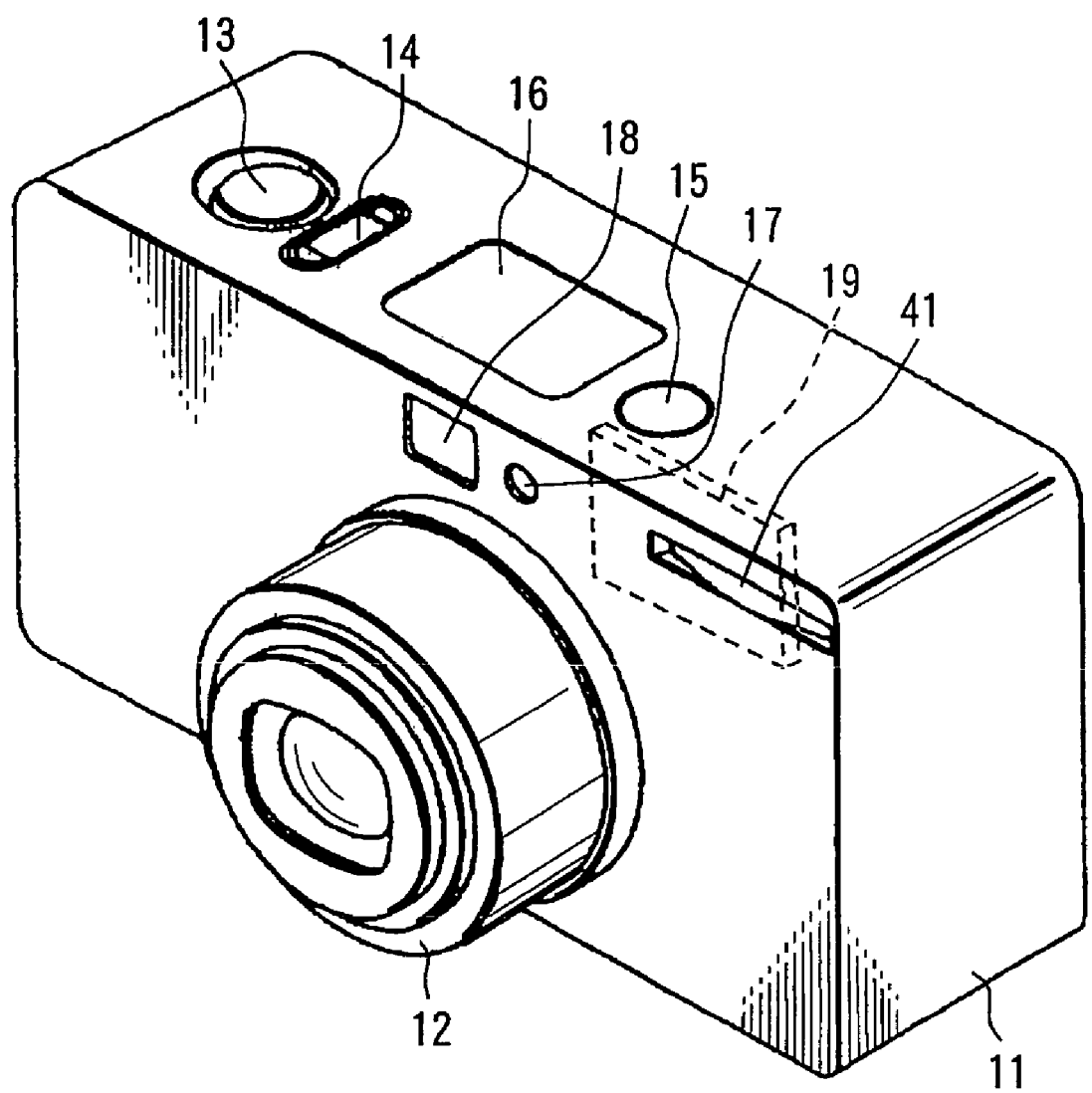
FIG. 14 shows a perspective view of a camera equipped with the illumination optical system according to Embodiment 4 of the present invention.

FIGS. 9, 11, and 13 show the structure of an illumination optical system according to Embodiment 4 of the present invention. Particularly, the figures show the structure of an illumination optical system incorporated in a camera. FIGS. 9A and B show cross-sectional views (vertical cross-sectional views) in a direction orthogonal to the optical axis of the illumination optical system, and FIG. 11 shows a horizontal cross-sectional view of the illumination optical system. FIGS. 9B and 11 also show traced drawings of light beams for representative light beams emitted from the center of the light source. FIG. 13 shows an exploded perspective view of the illumination optical system. FIG. 14 shows a camera equipped with the illumination optical system.

First, the structural components of the camera shown in FIG. 14 which are the same as those of Embodiment 1 shown in FIG. 6 have been given the same reference numerals used in FIG. 6, and their further description has been omitted. Reference numeral 41 denotes an illumination unit using the illumination optical system according to this embodiment which is disposed on the upper right when viewed from the front of a camera body 11.

In the following, the structural components which determine the optical characteristics of the illumination optical system according to this embodiment are described in detail with reference to FIGS. 9, 11 and 13.

In these figures, reference numeral 42 denotes a light-emitting discharge tube (xenon tube) in the shape of a cylindrical straight tube. Reference numeral 43 denotes a reflector (refection member) which reflects, to the front of the illumination unit, the component of the luminous flux emitted from the light-emitting discharge tube 42 which travels to the rear in a direction of the optical axis L and the component which travels in the vertical direction. The reflector 43 is made of, for example, a metallic material, such as radiant aluminum, having a high-reflectance inner surface, or a resin material having an inner surface on which a high-reflectance metal-evaporated surface is formed.

Reference numeral 44 denotes an optical member integrally formed from a transparent material. The optical member 44 includes an incidence surface 44a made up of a flat surface, and reflecting surfaces 44b and 44b' disposed at the top and the bottom in front of the incidence surface 44a, as shown in FIG. 9. The optical member 44 also includes right and left reflecting surfaces 44c and 44c', and an exit surface 44d made up of a cylindrical lens surface having refractive power in the horizontal direction, as shown in FIG. 11.

In order to achieve miniaturization, while improving the optical characteristics, this embodiment uses as the material of the optical member 44, a nanocomposite obtained by dispersing nano-scale, ultrafine inorganic particles in an organic polymer material serving as a base material of the optical member 44, or a hybrid resin material obtained by covalently bonding molecules of an organic polymer material serving as a base material and molecules of nano-scale, ultrafine inorganic particles.

As described in the above embodiments, the nanocomposite and the hybrid material of inorganic fine particles and an optical resin have unprecedented excellent characteristics (e.g., transparency, heat resistance, mechanical strength, surface hardness and moldability). This embodiment also achieves significant reduction in thickness and improvement in performance of the illumination optical system by utilizing these characteristics.

The operation of the camera in the camera and the illumination optical system having the above-described structures is the same as in Embodiment 1 above. Here, the action of the illumination optical system according to this embodiment is described in detail. In this embodiment, similarly to the above-described embodiments, the following descriptions are given based on FIGS. 9B and 11, which are the traced drawings of light beams emitted from approximately the center of the light-emitting discharge tube 42, for simplicity of description.

Of the luminous flux emitted from the light-emitting discharge tube 42, the luminous flux component emitted backward in a direction of the optical axis L and the luminous flux component emitted in the vertical direction enter the optical member 44 disposed in front of the light-emitting discharge tube 42 via reflection at the reflector 43, and the luminous flux component emitted forward in a direction of the optical axis L directly enters the optical member 44. Thereafter, these luminous flux components are converted to luminous flux components having predetermined light distribution characteristics, and then irradiated onto the object side.

In the following, an optimal method for setting the illumination optical system according to this embodiment, which is smaller than the conventional illumination optical system and is capable of uniformly irradiating illumination light in the required irradiation range with high efficiency, is described with reference to FIGS. 9A and B.

FIG. 9A shows a vertical cross-sectional view of the illumination optical system according to this embodiment in the radial direction of the light-emitting discharge tube 42, and shows a basic concept for optimizing the light distribution characteristics in the vertical direction. FIGS. 10A and B show a conventional illumination optical system for comparison with this embodiment.

In addition, FIGS. 9A and B and FIGS. 10A and B show the shapes at the same cross-section, and FIGS. 9B and 10B are diagrams in which traced drawings of light beams have been added to FIGS. 9A and 10A, respectively.

In these figures, reference numerals 42 and 112 denote light-emitting discharge tubes, and the inner and outer diameters of the glass tubes of the light-emitting discharge tubes 42 and 112 are shown. The reason is the same as described in Embodiment 1.

First, the shape of the portion of the reflectors 43 and 113 which is behind the light source center in a direction of the optical axis L is cylindrical (hereinafter referred to as "cylindrical portions 43$a$ and 113$a$") and substantially concentric with the light-emitting discharge tubes 42 and 112. This shape is effective to return the light reflected by the reflectors 43 and 113 to the vicinity of the light source center, and has the effect of preventing adverse influences from refractions of the glass portions of the light-emitting discharge tubes 42 and 112. Furthermore, such a structure makes it possible to handle the light reflected by the reflectors 43 and 113 as the outgoing light substantially equivalent to the direct light from the light source, thereby achieving miniaturization of the overall shape of the optical systems following the reflectors.

On the other hand, the upper and lower peripheral portions 43$b$, 43$b$', 113$b$ and 113$b$' of the reflectors 43 and 113 are made up of reflecting surfaces extending so as to be substantially in contact with the upper and lower end points of the incidence surfaces 44$a$ and 114$a$ of the optical members 44 and 114. These peripheral portions 43$b$, 43$b$', 113$b$ and 113$b$' are shaped such that a continuous transition is provided between the cylindrical portions 43$a$ and 113$a$ and the reflecting surfaces 44$b$, 44$b$', 114$b$ and 114$b$' of the optical members 44 and 114.

Figure 12:
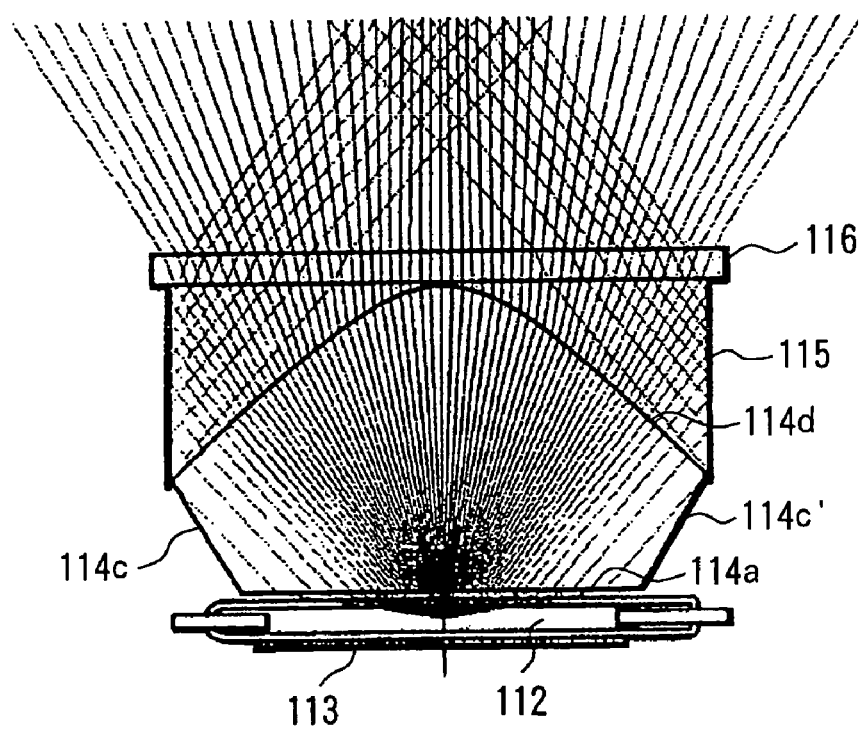
FIG. 12 shows a horizontal cross-sectional view of the conventional illumination optical system.

Similarly to the optical member of this embodiment, the optical member 114 shown in FIGS. 10A and B and FIG. 12 includes: an incidence surface 114$a$ made up of a flat surface; reflecting surfaces 114$b$ and 114$b$' disposed at the top and the bottom in front of the incidence surface 114$a$; right and left reflecting surfaces 114$c$ and 114$c$'; and an exit surface 114$d$ made up of a cylindrical lens surface having refractive power in the horizontal direction.

In the following, the shape of the optical member 44 is described which has the most significant influence on the light distribution characteristics of the illumination optical system according to this embodiment. In this embodiment, the thickness in the vertical direction of the illumination optical system is most reduced, and the curvature of the exit surface of the optical member is decreased such that the exit surface can be directly exposed to an exterior surface of an optical apparatus such as a camera. This eliminates the need to provide a reflection plate 115 covering the vicinity of the exit surface or a protection panel 116 for compensating for recessed portions in the lens portion caused by a large curvature, which have been necessary for the conventional structure shown in FIG. 10, thus achieving miniaturization and cost reduction. Moreover, the luminous flux can be emitted without using a plurality of optical members as in the conventional structure, so that it is possible to construct an illumination optical system which suffers little deterioration in optical characteristics. Furthermore, regarding the light distribution characteristics, the illumination optical system of this embodiment is configured such that a uniform light distribution can be achieved within the required irradiation range.

First, each portion of the optical member 44 is configured as shown in FIG. 9A. The incidence surface 44$a$ is a flat surface directly facing the light-emitting discharge tube 42 serving as the light source in extremely close proximity. The reflecting surfaces 44$b$ and 44$b$' are formed by curved surfaces such that the cross-sectional area is smallest in the vicinity of the incidence surface 44$a$ and gradually increases in a direction of the exit surface 44$d$. Furthermore, the exit surface 44$d$ is made up of a cylindrical lens surface having no refractive power in the vertical cross section shown in FIG. 9A.

By shaping each portion of the optical member 44 in the above-described manner, the luminous flux components emitted from the light-emitting discharge tube 42 pass through different optical paths depending on their angles of incidence on the optical member 44, and are converted to luminous flux components whose angles generally fall within a certain angle range. More specifically, the components having small angles of incidence on the incidence surface 44$a$ are directly emitted from the exit surface 44$d$, without being reflected at the upper and lower reflecting surfaces 44$b$ and 44$b$'. In this case, these components with small angles of incidence are not subjected to a condensing action at least in the cross section shown in FIG. 9A, and exit from the exit surface 44$d$ while maintaining the same angle characteristics as those they had upon entering the incidence surface 44$a$.

On the other hand, the components with large angles of incidence on the incidence surface 44$a$ are totally reflected at the upper and lower reflecting surfaces 44$b$ and 44$b$'. Then, the components with larger angles of incidence on the incidence surface 44$a$ are subjected to a larger number of reflections. Accordingly, upon reaching the exit surface 44$d$, these components are converted to luminous flux components within a predetermined angle range. Such a behavior of the luminous flux is shown in FIG. 9B.

From this figure, it can be seen that the luminous flux components irradiated into various directions from an angle range of 360° relative to the light-emitting discharge tube 42 are converted to luminous flux components within a substantially constant angle range, although they are emitted from the opening H, which is narrow in the vertical direction, of the optical member 44.

In the following, the effect of using a nanocomposite as the material of the optical member 44 in this embodiment is described with reference to FIGS. 10A and B. It should be noted that the optical member 114 shown in FIGS. 10A and B has the optimal shape in the case of using polymethyl methacrylate (PMMA: refractive index 1.492), which is widely used in ordinary illumination optical systems, and constitutes an illumination optical system having condensing characteristics (light emission characteristics) substantially equivalent to those of this embodiment.

As is clear from a comparison between FIGS. 9 and 10, by using a nanocomposite as the optical material, this embodiment makes it possible to significantly reduce the thickness of the optical member 44. In order to make a precise comparison of the sizes of the illumination optical systems, the light irradiation conditions in this embodiment other than the above-described material, such as the shapes of the light-emitting discharge tube 42 serving as the light source and of the reflector 43, the positional relationship between the light-emitting discharge tube 42 and the incidence surface 44a of the optical member 44, and the light-emitting characteristics of the light-emitting discharge tube 42, are the same as those of the conventional illumination optical system shown in FIGS. 10A and B, and a comparison was made solely between the shapes of the optical members 44 and 114.

The most significant difference between this embodiment and the conventional structure is that the overall shape, in particular, the thickness in the vertical direction of the illumination optical system of this embodiment is much smaller. In the examples shown in the figures, the conventional structure shown in FIGS. 10A and B requires the dimension h for the above-described thickness. In contrast, this embodiment requires the dimension H (<h) for the thickness in the vertical direction, and can form an optical system having condensing characteristics (light irradiation characteristics) substantially equivalent to those of the conventional structure, with this small thickness.

Thus, using a material with a high refractive index as the material of the optical member 44 makes it possible to form an extremely thin illumination optical system having optical characteristics substantially equivalent to those of the conventional structure, thus reducing the overall size of an optical apparatus equipped with such an illumination optical system. Particularly, this embodiment has achieved about 35% reduction in the thickness of the optical member 44, whose shape is most significantly changed, by drastically increasing the refractive index of the optical material.

Furthermore, the optical system of this embodiment makes it possible not only to reduce the thickness in the vertical direction, but to decrease the number of parts as well, by using a high refractive index material as described above, thereby also reducing the total length in a direction of the optical axis to some extent. In the examples shown in the figures, whereas the conventional structure shown in FIGS. 10A and B has the total length d in the optical axis direction, this embodiment using a high refractive index material requires the total length D (<d) in the optical axis direction to form an optical system having optical characteristics substantially equivalent to those of the conventional structure. Specifically, this embodiment has achieved about 10% reduction in the total length in the optical axis direction.

Thus, according to this embodiment, all the luminous flux components emitted from the center of the light-emitting discharge tube 42 in a direction substantially orthogonal to the longitudinal direction of the light-emitting discharge tube 42 are converted to luminous flux components having a uniform light distribution by the actions of the optical members shown in FIG. 9B. Moreover, it is possible to achieve unprecedented miniaturization of the entire illumination optical system.

In the following, a condensing action in the longitudinal direction of the light-emitting discharge tube according to this embodiment is described with reference to FIGS. 11 and 12.

FIG. 11 shows a cross-sectional view of the illumination optical system on a plane including the central axis of the light-emitting discharge tube 42, and is accompanied by a traced drawing of light beams from the center in the longitudinal and radial directions of the light-emitting discharge tube 42. FIG. 12 shows an illumination optical system in which the optical member 114 is made of a conventional material, and similarly to FIG. 11, is accompanied by a traced drawing of light beams from the center in the longitudinal and radial directions of the light-emitting discharge tube 112.

First, the structure of the conventional optical system is described with reference to FIG. 12. It should be noted that the material of the optical member 114 shown in FIG. 12 is polymethyl methacrylate (PMMA: refractive index 1.492), which has a lower refractive index than the material of the optical member 44 of this embodiment.

As shown in FIG. 12, the exit surface 114d of the optical member 114 is formed by a cylindrical lens surface having a large curvature, in order to condense light emitted from the light-emitting discharge tube 112. When trying to achieve a small illumination optical system having a significant condensing effect while using such an optical material having a low refractive index, it is not possible to obtain the desired condensing effect without increasing the curvature on the exit surface side. In addition, a curved surface with such a large curvature cannot be directly exposed to an exterior surface of an optical apparatus such as a camera, so that it is necessary to provide a protection panel 116 for preventing a recessed portion from being formed on the exterior surface.

Furthermore, in order to guide the luminous flux condensed by the optical member 114 to the protection panel 116 with high efficiency, it is necessary to provide a reflection plate 115 configured so as to completely cover the space between the exit surface 114d of the optical member 114 and the protection panel 116. As described above, with the conventional structure, it was possible to efficiently convert a luminous flux into a luminous flux having uniform light distribution characteristics within a relatively thin overall space, although the number of the structural components was increased.

On the other hand, when an optical material having a relatively high refractive index is used as in this embodiment, it is possible to form an illumination optical system having optical characteristics substantially equivalent to those of the optical structure shown in FIG. 12 in a far simpler structure. The reason is that using a high refractive index material as the optical material provides a great refractive action, thus making it possible to efficiently condense light even with optical surface having a very small curvature. As shown in the examples in the figures, using a high refractive index material allows an optical surface having a weak (small) curvature, such as the exit surface 44d, to have a substantially equivalent condensing effect. An optical surface having a curvature of this degree can be directly exposed as an exterior member of an optical apparatus such as a camera, without impairing the appearance of the optical apparatus. Moreover, due to the characteristics of the nanocomposite, the mechanical strength is higher than that provided by the conventional material, it is possible, also in this regard, to directly expose the exit surface 44d of the optical member 44 as the exterior member without any problem.

Further, since the luminous flux emitted from the light source is irradiated without using many optical members in this embodiment, the optical efficiency is excellent and a limited energy can be effectively utilized.

Although this embodiment shows a care where each surface on the incidence surface side and each surface structure on the exit surface side of the optical member 44 are symmetric with respect to the optical axis L, this embodiment is not limited to such a symmetric shape.

Embodiment 5

Figure 15:
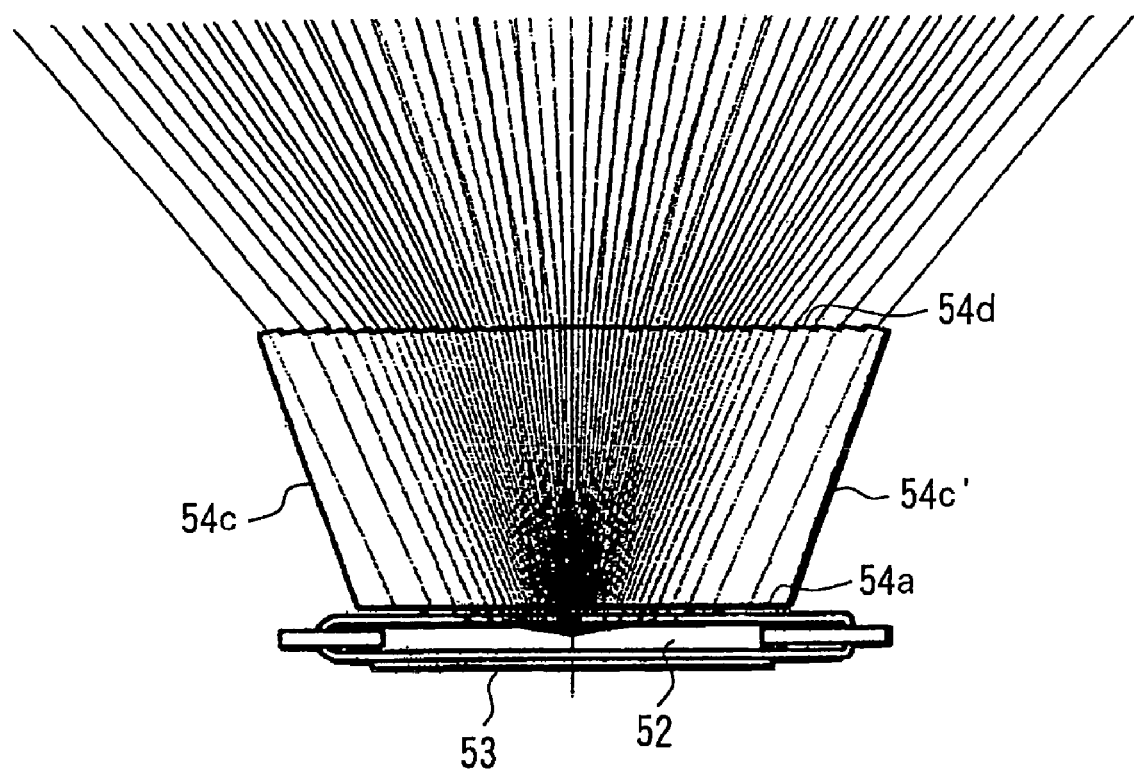
FIG. 15 shows a horizontal cross-sectional view of an illumination optical system according to Embodiment 5 of the present invention.

FIG. 15 shows the structure of an illumination optical system according to Embodiment 5 of the present invention, in particular, an illumination optical system incorporated in a camera. It should be noted that this embodiment is an example of a partial modification of Embodiment 4, and FIG. 15 shows only the vertical cross-sectional view corresponding to FIG. 11 described above. FIG. 15 also shows a traced drawing of light beams for representative light beams emitted from the light source center.

As shown in the figure, an optical member 54 of this embodiment is different from the optical member 44 of FIG. 11 in that a Fresnel lens is used for an exit surface 54d of the optical member 54. The rest of the structure is substantially the same as that of Embodiment 4, and thus is described only briefly.

In FIG. 15, reference numeral 52 denotes a light-emitting discharge tube (xenon tube). Reference numeral 53 denotes a reflector, which is formed in substantially the same shape as the reflector 43 of Embodiment 4. Reference numeral 54 denotes an optical member which uses a nanocomposite material and includes an incidence surface 54a, side reflecting surfaces 54c and 54c', and an exit surface 54d.

The characteristic feature of this embodiment lies in that the exit surface 54d of the optical member 54 is made up of a Fresnel lens surface. This makes it possible to form an optical system which has no adverse effect on the external shape of an optical apparatus such as a camera, with almost no harmful influence exerted on its optical characteristics. Additionally, by using a nanocomposite as the material of the optical member 54 and setting the refractive index of the optical member 54 high, it is possible to set the angle of each surface of the Fresnel lens gentle as shown in the figure, and to mold the optical member easily.

Further, as can be seen from a comparison between FIGS. 15 and 11, which show the luminous flux emitted from the vicinity of the center of the light-emitting discharge tube 52, the optical characteristics of this embodiment are substantially equivalent to those of the optical system of Embodiment 4.

As described above, according to the above-described embodiments, refraction and total reflection of the luminous flux emitted in various directions from the light source are utilized with high efficiency, using the optical member made of a nanocomposite or of a hybrid resin material obtained by covalently bonding molecules of a resin material serving as the base material and molecules of nano-scale, ultrafine particles. This makes it possible to achieve the reduction in the size or the thickness, while maintaining optical characteristics (light emission characteristics) equivalent to those obtained by using an optical member made of only the above-described base material. Therefore, it is possible to achieve miniaturization and more efficient use of space for optical apparatuses such as cameras using the above-described illumination optical systems.

Moreover, the number of parts can be reduced depending on the structure, making it possible to cut down the cost and to irradiate light with a small number of optical members. Accordingly, it is possible to reduce the amount of light energy loss when light passes through optical members, thus increasing the amount of the effective energy of light irradiated within the required irradiation range, as compared with the conventional illumination optical systems. That is, the efficiency of the illumination optical system can be significantly improved.

Further, since the optical member can be formed with surfaces having a relatively small curvature, it is possible to achieve a simplified shape, for example, a shape having less projections and depressions, for the optical member. Therefore, it is possible, for example, to reduce the time required for the molding and the cost for the molds, so that a sufficient cost reduction can be expected for the processing.

Furthermore, the optical characteristics can be improved by varying the concentration distribution of the ultrafine particles contained in the optical member in the vicinity of the surface of the optical member with respect to the concentration distributions in the remaining portions. Accordingly, it is possible to form a highly efficient optical system which suffers little loss in light quantity resulting from surface reflections and has a few transmitted light beams which cannot be totally reflected by the reflecting surfaces.

While preferred embodiments have been described, it is to be understood that modification and variation of the present invention may be made without departing from the scope of the following claims.

"This application claims priority from Japanese Patent Application No. 2003-399735 filed on Nov. 28, 2003, which is hereby incorporated by reference herein."

What is claimed is:

1. An illumination optical system comprising:
   a light source irradiating illumination light used for image taking; and
   an optical member disposed in a direction of irradiation of light from the light source,
   wherein the optical member is made of a particle-containing material with particles having a particle size smaller than 1 µm contained in a base material made of a resin material,
   wherein the optical member comprises an incidence surface, an exit surface, and a reflecting surface which guides light which has entered from the incidence surface to the exit surface by using total reflection action, and
   wherein, in the optical member, a concentration distribution of the particles in a vicinity of the reflecting surface is higher than a concentration distribution of the particles in a portion other than the vicinity of the reflecting surface.

2. An image-taking apparatus comprising:
   an illumination optical system according to claim 1 which illuminates an object; and
   an image-pickup element which photoelectrically converts an image of the object.

* * * * *

UNITED STATES PATENT AND TRADEMARK OFFICE
CERTIFICATE OF CORRECTION

PATENT NO. : 7,258,457 B2
APPLICATION NO. : 10/989420
DATED : August 21, 2007
INVENTOR(S) : Yoshiharu Tenmyo It is certified that error appears in the above-identified patent and that said Letters Patent is hereby corrected as shown below:

COLUMN 2
Line 17, "source," should read --source--.

COLUMN 4
Line 37, "(refection member)" should read --(reflection member)--.

COLUMN 5
Line 62, "is" should read --are--.
Line 63, "interfere" should read --interfere with--.

COLUMN 6
Line 16, "exit" should read --exits--.

COLUMN 9
Line 52, "so" should read --to--.

COLUMN 11
Line 26, "a" should read --an--.

COLUMN 12
Line 1, "symmetric" should read --symmetrical--.
Line 8, "be constant," should read --remain constant,--.

COLUMN 13
Line 24, "show" should read --shows--.

COLUMN 15
Line 2, "a" should read --an--.

COLUMN 20
Line 4, "have" should read --has--.

UNITED STATES PATENT AND TRADEMARK OFFICE
CERTIFICATE OF CORRECTION

PATENT NO. : 7,258,457 B2
APPLICATION NO. : 10/989420
DATED : August 21, 2007
INVENTOR(S) : Yoshiharu Tenmyo It is certified that error appears in the above-identified patent and that said Letters Patent is hereby corrected as shown below:

COLUMN 22
Line 61, "material, it" should read --material. It--.

Signed and Sealed this

Twenty-seventh Day of January, 2009

JOHN DOLL
*Acting Director of the United States Patent and Trademark Office*